(12) United States Patent
Chandrashekar et al.

(10) Patent No.: US 11,441,657 B2
(45) Date of Patent: Sep. 13, 2022

(54) AXLE ASSEMBLY AND SHIFT MECHANISM FOR A SHIFT COLLAR

(71) Applicant: ArvinMeritor Technology, LLC, Troy, MI (US)

(72) Inventors: Supreeth Chandrashekar, Troy, MI (US); David Zueski, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 10 days.

(21) Appl. No.: 17/178,510

(22) Filed: Feb. 18, 2021

(65) Prior Publication Data

US 2022/0260146 A1 Aug. 18, 2022

(51) Int. Cl.
*F16H 63/30* (2006.01)
*F16H 48/34* (2012.01)
*F16H 48/08* (2006.01)
*F16H 48/38* (2012.01)

(52) U.S. Cl.
CPC ............ *F16H 48/34* (2013.01); *F16H 48/08* (2013.01); *F16H 48/38* (2013.01); *F16H 63/30* (2013.01); *F16H 2048/087* (2013.01); *F16H 2048/343* (2013.01)

(58) Field of Classification Search
CPC .......... F16H 48/38; F16H 63/02; F16H 63/04; F16H 63/30; F16H 2063/3093; F16H 2063/3063; F16H 2063/324; F16H 63/32
See application file for complete search history.

(56) References Cited

U.S. PATENT DOCUMENTS

| 1,981,236 | A | | 11/1934 | Logue |
| 3,788,157 | A | * | 1/1974 | Carlson ................... F16H 63/32 |
| | | | | 192/48.91 |
| 6,176,146 | B1 | | 1/2001 | Ore |
| 7,798,937 | B2 | | 9/2010 | Gitt |
| 9,719,563 | B2 | | 8/2017 | Hirao |
| 10,500,941 | B2 | * | 12/2019 | Garcia ................ B60K 7/0007 |
| 10,995,854 | B2 | * | 5/2021 | Schulte .................. F16H 63/30 |
| 2011/0111910 | A1 | | 5/2011 | Ideshio et al. |
| 2014/0311266 | A1 | | 10/2014 | Nakashima et al. |
| 2017/0059007 | A1 | | 3/2017 | Eo et al. |
| 2018/0015816 | A1 | | 1/2018 | Robinette et al. |
| 2018/0112770 | A1 | | 4/2018 | Hansson et al. |
| 2019/0054816 | A1 | | 2/2019 | Garcia et al. |
| 2019/0054817 | A1 | | 2/2019 | Garcia et al. |
| 2019/0054818 | A1 | | 2/2019 | Garcia et al. |

(Continued)

FOREIGN PATENT DOCUMENTS

| CN | 108644371 A | * | 10/2018 | |
| DE | 10224357 A1 | * | 12/2003 | ............. F16D 11/10 |
| DE | 102009030010 A1 | * | 12/2010 | ............. F16H 25/20 |

OTHER PUBLICATIONS

U.S. Appl. No. 16/594,362, filed Oct. 7, 2019; 31 Pages.

(Continued)

*Primary Examiner* — Sherry L Estremsky
(74) *Attorney, Agent, or Firm* — Brooks Kushman PC

(57) ABSTRACT

An adjuster mechanism and an axle assembly that includes an adjuster mechanism. The adjuster mechanism may include a collar assembly that has a collar that may receive a shift collar, a follower, and an adjustment screw. Rotating the adjustment screw may move the collar assembly and the shift collar along an axis.

20 Claims, 15 Drawing Sheets

(56) References Cited

U.S. PATENT DOCUMENTS

| | | |
|---|---|---|
| 2020/0173494 A1 | 6/2020 | Smith et al. |
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |

OTHER PUBLICATIONS

U.S. Appl. No. 16/594,702, filed Oct. 7, 2019; 32 Pages.
U.S. Appl. No. 16/594,932, filed Oct. 7, 2019; 33 Pages.
U.S. Appl. No. 16/594,875, filed Oct. 7, 2019; 49 Pages.
U.S. Appl. No. 17/063,866, filed Oct. 6, 2020; 63 Pages.

\* cited by examiner

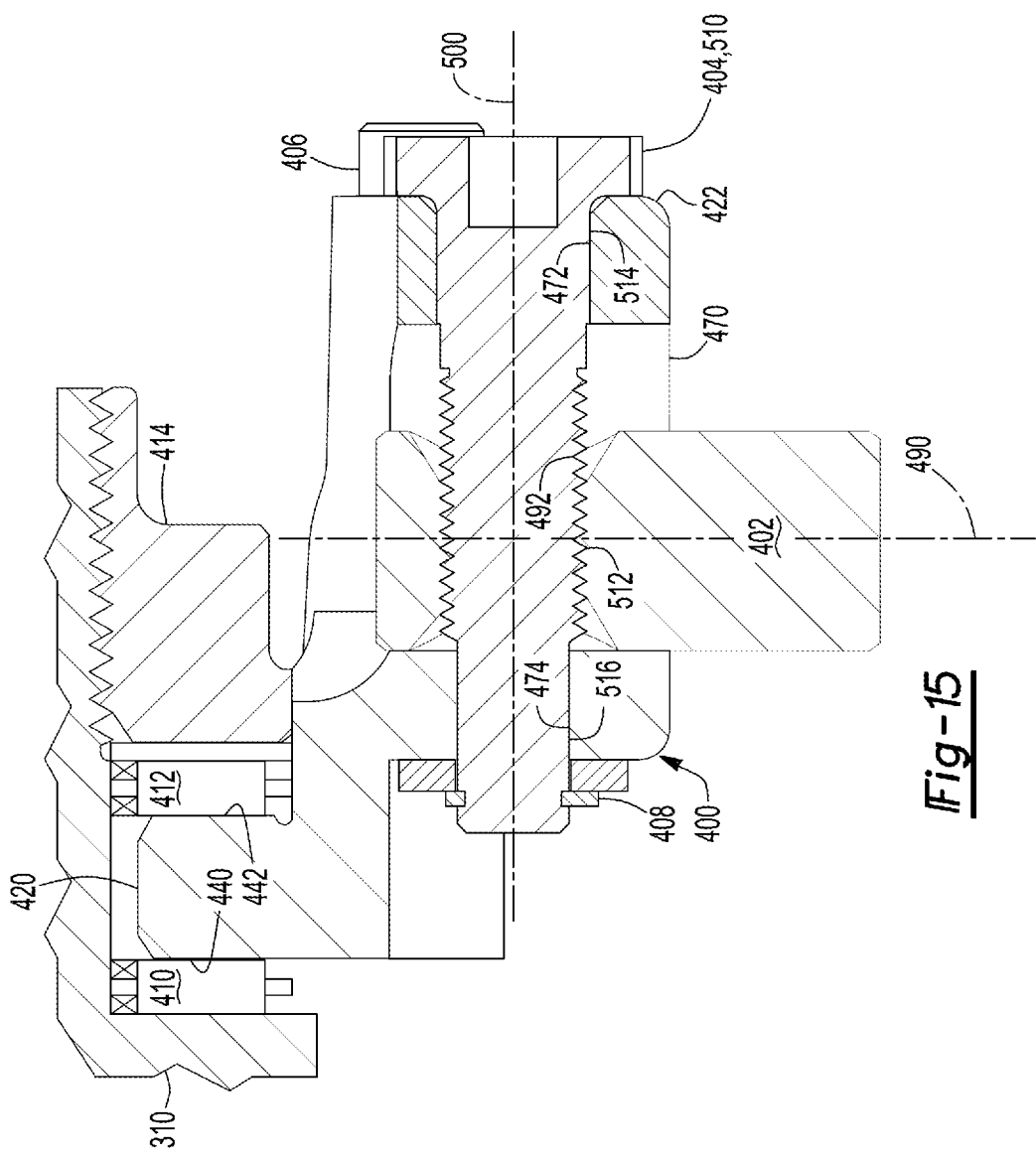

AXLE ASSEMBLY AND SHIFT MECHANISM FOR A SHIFT COLLAR

TECHNICAL FIELD

This disclosure relates to a shift mechanism for a shift collar and an axle assembly having a shift mechanism.

BACKGROUND

An axle assembly having a clutch collar is disclosed in U.S. Pat. No. 9,719,563.

SUMMARY

In at least one embodiment a shift mechanism is provided. The shift mechanism may include a shift collar, an actuator, and an adjuster mechanism. The adjuster mechanism may include a collar assembly, a follower, and an adjustment screw. The collar assembly may include a collar and a shift block. The collar may define a collar hole that may receive the shift collar. The shift block may be fixedly positioned with respect to the collar. The shift block may define an elongated slot and a first hole that extends from the elongated slot. The follower may be partially received in the elongated slot and may be operatively connected to the actuator. The follower may define a threaded hole. The adjustment screw may be received in the first hole and the threaded hole. The adjustment screw may be rotatable about an adjustment screw axis. Rotating the adjustment screw may move the collar assembly and the shift collar along an axis.

In at least one embodiment an axle assembly is provided. The axle assembly may include a drive pinion, a transmission, and a shift mechanism. The drive pinion may be rotatable about an axis. The transmission may include a set of drive pinion gears that may be spaced apart from the drive pinion and that may be rotatable about the axis. The shift mechanism may include a shift collar, an actuator, and an adjuster mechanism. The shift collar may be rotatable about the axis with the drive pinion and may be movable along the axis with respect to the drive pinion. The actuator may be configured to move the shift collar along the axis to selectively connect a member of the set of drive pinion gears to the drive pinion. The adjuster mechanism may connect the actuator to the shift collar. The adjuster mechanism may include a collar assembly, a follower, and an adjustment screw. The collar assembly may include a collar and a shift block. The collar may define a collar hole that may receive the shift collar. The shift block may be fixedly positioned with respect to the collar. The shift block may define an elongated slot in a first hole that may extend from the elongated slot. The follower may be partially received in the elongated slot and may be operatively connected to the actuator. The follower may define a threaded hole. The adjustment screw may be received in the first hole and the threaded hole. The adjustment screw may be rotatable about an adjustment screw axis. Rotating the adjustment screw may move the collar assembly with respect to the follower.

BRIEF DESCRIPTION OF THE DRAWINGS

FIG. 15 illustrates an example of the adjuster mechanism in an adjusted position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
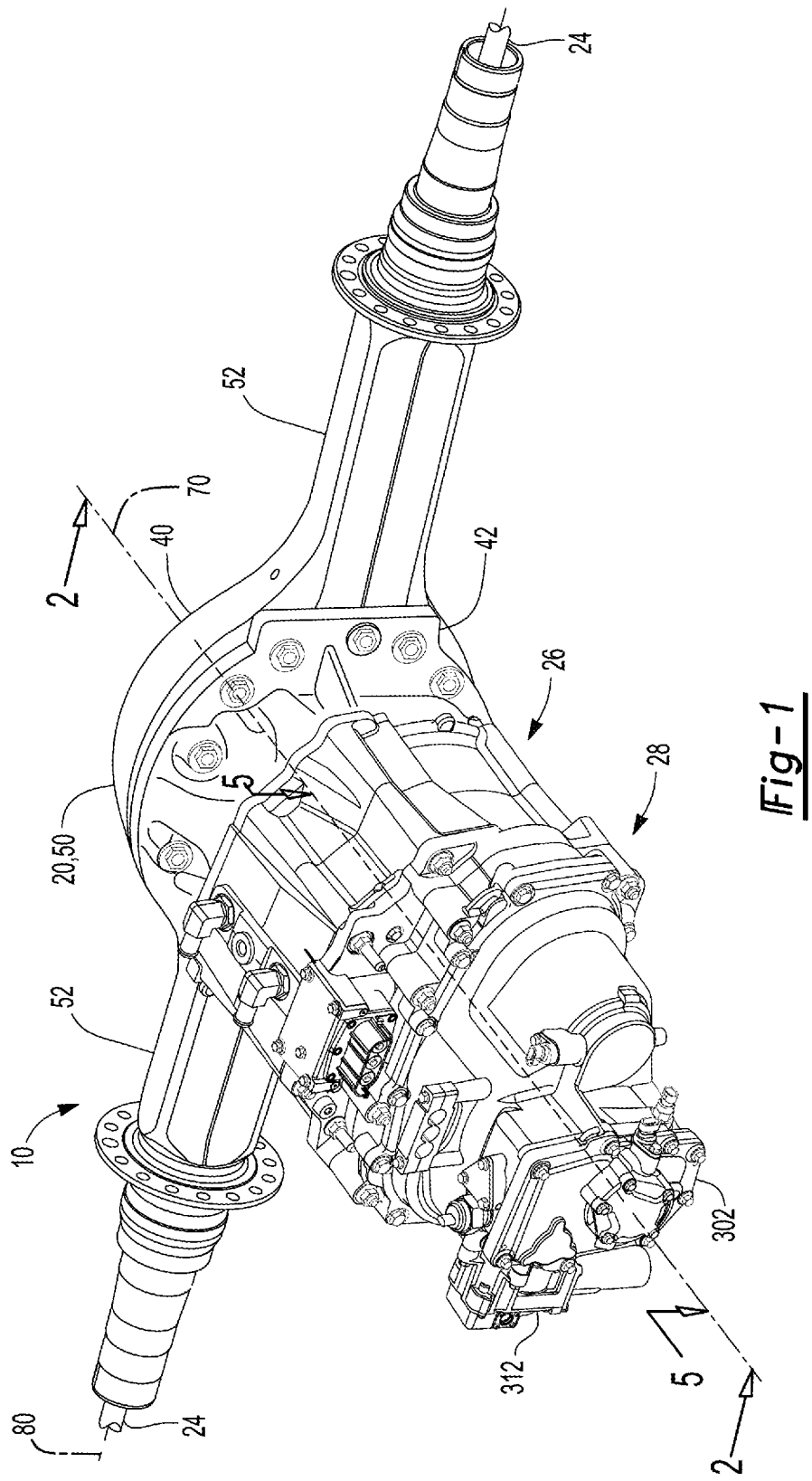
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

One or more axle assemblies may be provided with the vehicle. As is best shown with reference to FIGS. 1 and 2, the axle assembly 10 may include a housing assembly 20, a differential assembly 22, at least one axle shaft 24, an electric motor module 26, and a transmission module 28, a drive pinion 30, a shift mechanism 32, or combinations thereof.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

Figure 2:
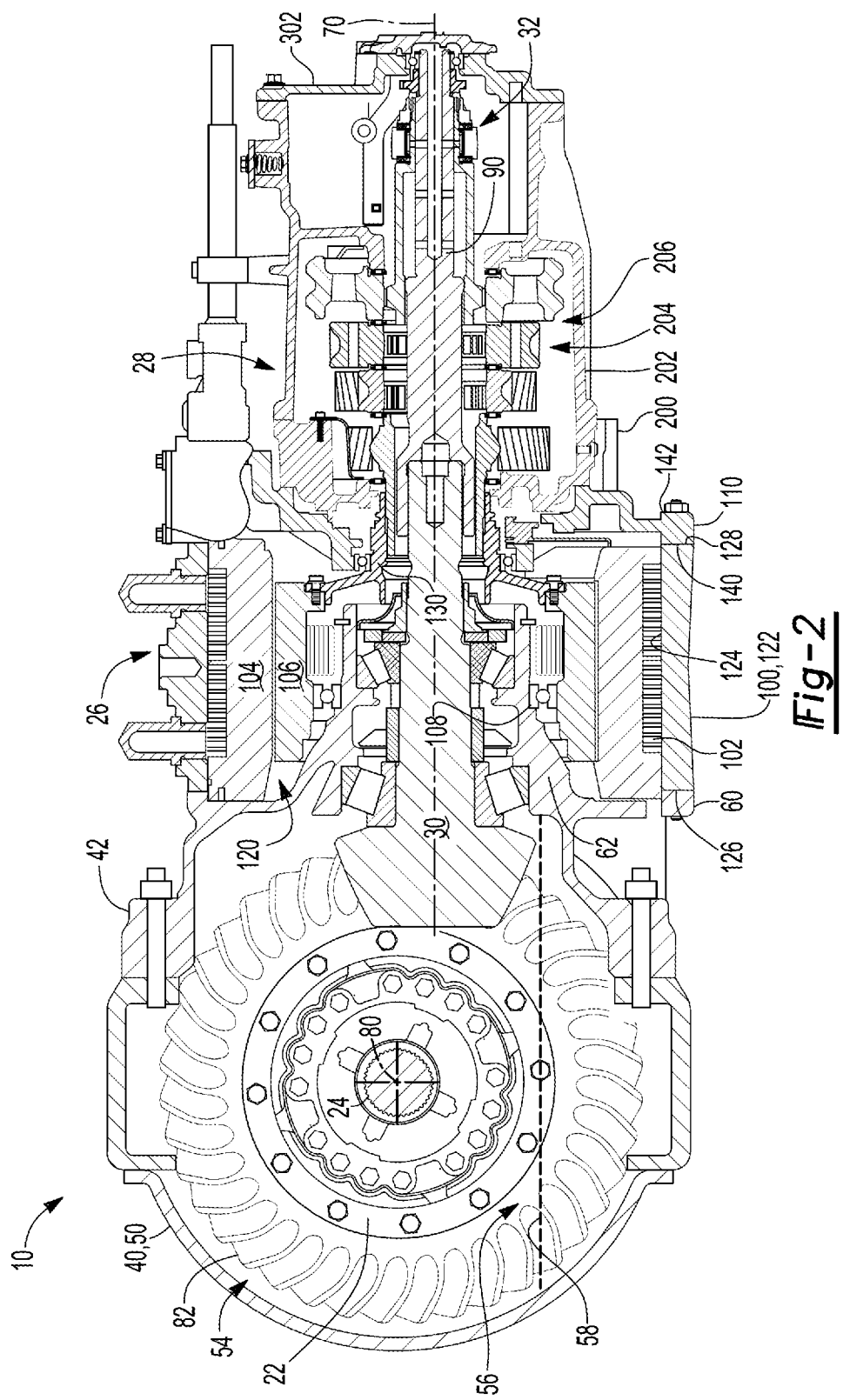
FIG. 2 is a section view of the axle assembly along section line 2-2.

The center portion 50 may be disposed proximate the center of the axle housing 40. As is best shown in FIG. 2, the center portion 50 may define a cavity 54 that may at least partially receive the differential assembly 22. A lower region of the center portion 50 may at least partially define a sump portion 56 that may contain or collect lubricant 58. Lubricant 58 in the sump portion 56 may be splashed by a ring gear 82 of the differential assembly 22 and distributed to lubricate various components that may or may not be received in the housing assembly 20. For instance, some splashed lubricant 58 may lubricate components that are received in the cavity 54 like the differential assembly 22, bearing assemblies that rotatably support the differential assembly 22, a drive pinion 30, and so on, while some splashed lubricant 58 may be routed out of the cavity 54 to lubricate components located outside of the housing assembly 20, such as components associated with the transmission module 28, the shift mechanism 32, or both.

Referring to FIG. 1, one or more arm portions 52 may extend from the center portion 50. For instance, two arm portions 52 may extend in opposite directions from the center portion 50 and away from the differential assembly 22. The arm portions 52 may have similar configurations. For example, the arm portions 52 may each have a hollow tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring primarily to FIG. 2, the differential carrier 42 may be mounted to the center portion 50 of the axle housing 40. The differential carrier 42 may support the differential assembly 22 and may facilitate mounting of the electric motor module 26. For example, the differential carrier 42 may include one or more bearing supports that may support a bearing like a roller bearing assembly that may rotatably support the differential assembly 22. In at least one configuration, the differential carrier 42 may include a mounting flange 60 and/or a bearing support wall 62.

The mounting flange 60 may facilitate mounting of the electric motor module 26. As an example, the mounting flange 60 may be configured as a ring that may extend around the axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support a bearing that may rotatably support the drive pinion 30, a bearing that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 30 and the bearings that rotatably support the drive pinion 30. The bearing support wall 62 may be integrally formed with the differential carrier 42 or may be a separate component that is fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth that mate or mesh with the teeth of a gear portion of a drive pinion 30. Accordingly, the differential assembly 22 may receive torque from the drive pinion 30 via the ring gear 82 and transmit torque to the axle shafts 24.

The drive pinion 30 may operatively connect the transmission module 28 to the differential assembly 22. As such, the drive pinion 30 may transmit torque between the differential assembly 22 and the transmission module 28. In at least one configuration, the drive pinion 30 may be rotatable about the axis 70 and may be rotatably supported inside another component, such as the bearing support wall 62.

Figure 6:
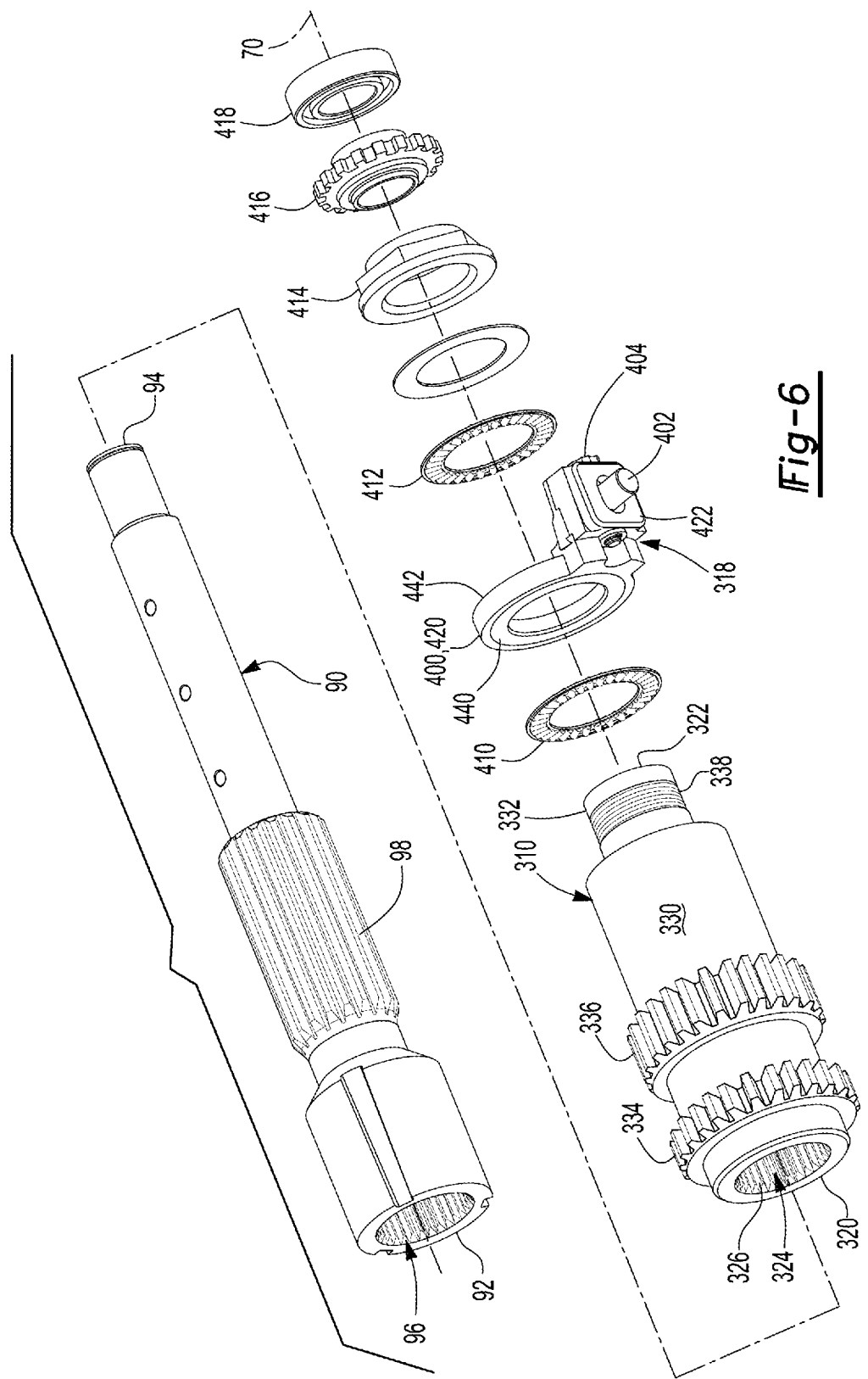
FIG. 6 is an exploded view of a portion of the shift mechanism and the shift collar shown in FIG. 5.

Referring primarily to FIGS. 2 and 6, the drive pinion 30 may optionally include or may be coupled to a drive pinion extension 90. The drive pinion extension 90 may increase the axial length of the drive pinion 30. In at least one configuration, the drive pinion extension 90 may be a separate component from the drive pinion 30 and may be coupled to the drive pinion 30 such that the drive pinion extension 90 is rotatable about the axis 70 with the drive pinion 30. In addition, the drive pinion extension 90 may be fixedly positioned with respect to the drive pinion 30 such that the drive pinion extension 90 may not move along the axis 70 with respect to the drive pinion 30. It is also contemplated that the drive pinion extension 90 may be integrally formed with the drive pinion 30, in which case the drive pinion 30 may be a one-piece unitary component having a greater axial length.

In at least one configuration, the drive pinion extension 90 may extend from a first end 92 to a second end 94 and may include a socket 96 and the spline 98. The socket 96 may extend from the first end 92 and may receive the drive pinion 30. The second end 94 may be received inside and may be rotatably supported by a support bearing 418. The spline 98, if provided, may facilitate coupling of the drive pinion extension 90 to a shift collar 310 that may be moveable along the axis 70 as will be discussed in more detail below.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the transmission module 28 and the drive pinion 30 as will be discussed in more detail below. The electric motor module 26 may be primarily disposed outside the differential carrier 42. In addition, the electric motor module 26 may be axially positioned between the axle housing 40 and the transmission module 28. In at least one configuration, the electric motor module 26 may include a motor housing 100, a coolant jacket 102, a stator 104, a rotor 106, and at least one rotor bearing assembly 108. The electric motor module 26 may also include a motor cover 110.

The motor housing 100 may extend between the differential carrier 42 and the motor cover 110. The motor housing 100 may be mounted to the differential carrier 42 and the motor cover 110. For example, the motor housing 100 may extend from the mounting flange 60 of the differential carrier 42 to the motor cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, and a second end surface 128.

The exterior side 122 may face away from the axis 70 and may define an exterior or outside surface of the motor housing 100.

The interior side 124 may be disposed opposite the exterior side 122 and may face toward the axis 70. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42 and may engage or contact the mounting flange 60.

The second end surface 128 may be disposed opposite the first end surface 126. As such, the second end surface 128 may be disposed at an end of the motor housing 100 that may face toward the motor cover 110 and may engage or contact the motor cover 110.

The coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially (e.g., in a direction along the axis 70) between the differential carrier 42 and the motor cover 110. For example, the coolant jacket 102 may extend axially from the differential carrier 42 to the motor cover 110. In addition, the coolant jacket 102 may extend around the axis 70 and around the stator 104. Accordingly, the stator 104 may be at least partially received in and may be encircled by the coolant jacket 102. The coolant jacket 102 may extend in a radial direction from the stator 104 to the interior side 124 of the motor housing 100. In at least one configuration, the coolant jacket 102 may include a plurality of channels through which coolant may flow.

The stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. In addition, the rotor 106 may extend around and may be supported by the bearing support wall 62. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104.

One or more rotor bearing assemblies 108 may rotatably support the rotor 106. For example, a rotor bearing assembly 108 may extend around and receive the bearing support wall 62 of the differential carrier 42 and may be received inside of the rotor 106. The rotor 106 may be operatively connected to the drive pinion 30. For instance, a coupling such as a rotor output flange 130 may operatively connect the rotor 106 to the transmission module 28, which in turn may be operatively connectable to the drive pinion 30.

The motor cover 110 may be mounted to the motor housing 100 and may be disposed opposite the axle housing 40 and the differential carrier 42. For example, the motor cover 110 may be mounted to the second end surface 128 of the motor housing 100. The motor cover 110 may be spaced apart from and may not engage the differential carrier 42. The motor cover 110 may be provided in various configurations. In at least one configuration, the motor cover 110 may include a first side 140 and a second side 142. The first side 140 may face toward and may engage the motor housing 100. The second side 142 may be disposed opposite the first side 140. The second side 142 may face away from the motor housing 100. The motor cover 110 may also include a motor cover opening through which the drive pinion 30 may extend. The motor cover 110 may be integrated with the transmission module 28 or may be a separate component.

Transmission Module

Figure 5:
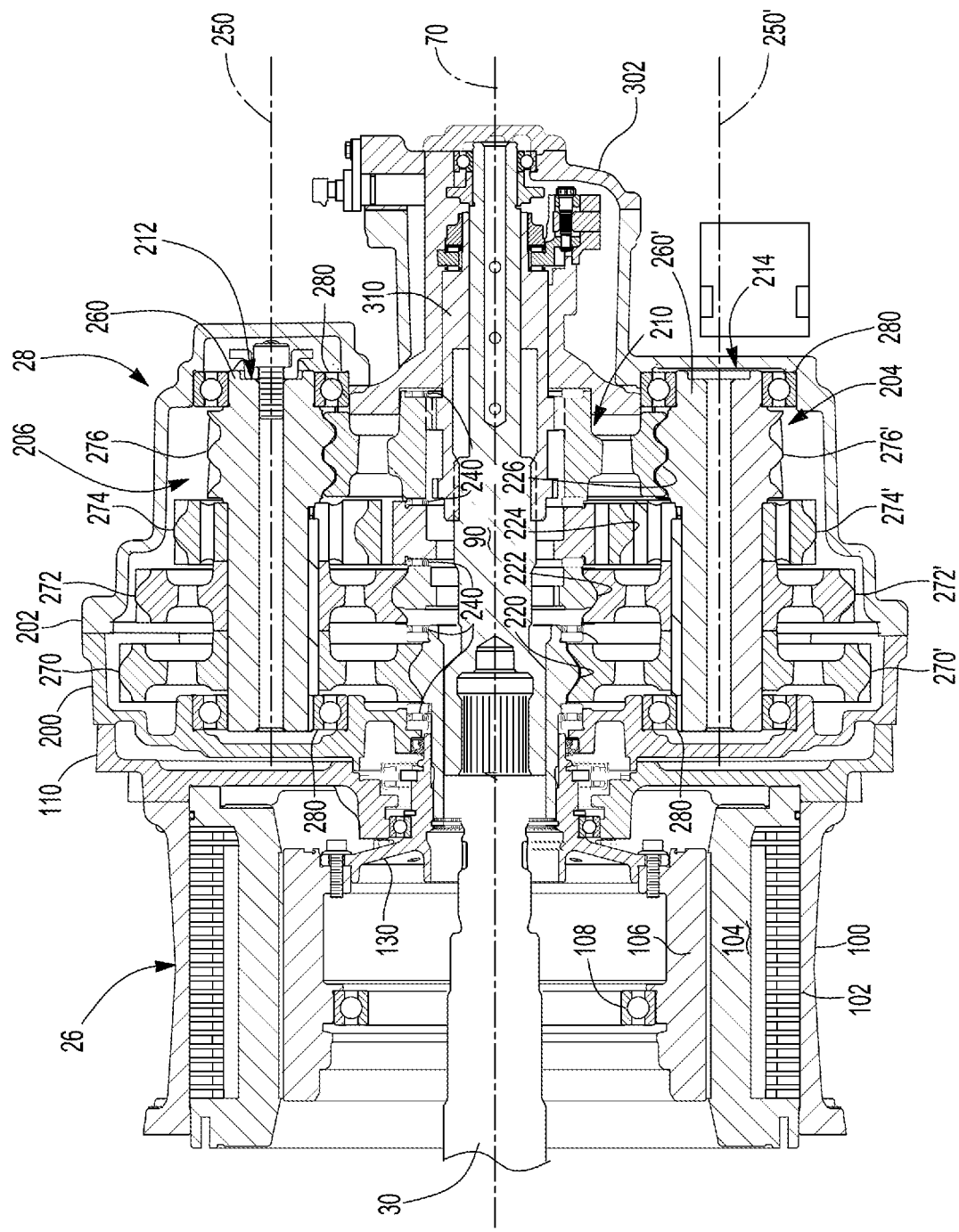
FIG. 5 is a section view of a portion of the axle assembly along section line 5-5 with a second configuration of a shift collar.

Referring to FIGS. 2 and 5, the transmission module 28 may transmit torque between the electric motor module 26 and the differential assembly 22. As such, the transmission module 28 may be operatively connectable to the electric motor module 26 and the differential assembly 22. In at least one configuration, the transmission module 28 may include a first transmission housing 200, a second transmission housing 202, and a transmission 204. The first transmission housing 200 and the second transmission housing 202 may cooperate to define a transmission housing cavity 206 that may receive the transmission 204.

The first transmission housing 200 may be mounted to the electric motor module 26. For instance, the first transmission housing 200 may be mounted to the second side 142 of the motor cover 110. As such, the motor cover 110 may separate the first transmission housing 200 from the motor housing 100.

The second transmission housing 202 may be mounted to the first transmission housing 200. For instance, the first transmission housing 200 may be mounted to and may engage or contact a side of the first transmission housing 200 that may face away from the motor cover 110. As such, the first transmission housing 200 may separate the second transmission housing 202 from the motor cover 110.

The transmission 204 may be operatively connected to the electric motor. In at least one configuration and as is best shown in FIG. 5, the transmission 204 may be configured as a countershaft transmission that may include a set of drive pinion gears 210, a first countershaft gear set 212, and optionally a second countershaft gear set 214.

The set of drive pinion gears 210 may be received in the transmission housing cavity 206 and may be arranged along the axis 70 between the first transmission housing 200 and the second transmission housing 202. The set of drive pinion gears 210 may include a plurality of gears, some of which may be selectively coupled to the drive pinion 30. In the configuration shown, the set of drive pinion gears 210 includes a first gear 220, a second gear 222, a third gear 224, and a fourth gear 226; however, it is to be understood that a greater or lesser number of gears may be provided.

The first gear 220 may extend around the axis 70 and may be disposed proximate the first transmission housing 200. In at least one configuration, the first gear 220 may have a through hole that may receive the drive pinion 30, an extension of the drive pinion 30 like the drive pinion extension 90, or both. The first gear 220 may have a plurality of teeth that may be arranged around and may extend away from the axis 70. The teeth of the first gear 220 may contact and may mate or mesh with teeth of a first countershaft gear that may be provided with the first countershaft gear set 212 and the second countershaft gear set 214 as will be discussed in more detail below. The first gear 220 may be operatively connected to the rotor 106 of the electric motor module 26 such that the rotor 106 and the first gear 220 are rotatable together about the axis 70. For example, the first gear 220 may be fixedly positioned with respect to the rotor 106 or fixedly coupled to the rotor 106 such that the first gear 220 is not rotatable about the axis 70 with respect to the rotor 106. It is contemplated that the first gear 220 may be fixedly mounted to or integrally formed with the rotor output flange 130. As such, the first gear 220 may be continuously connected to the rotor 106 such that the first gear 220 and the rotor 106 may be rotatable together about the axis 70 but may not be rotatable with respect to each other. It is also contemplated that the first gear 220 may be selectively coupled to the drive pinion 30 or drive pinion extension 90, such as with a shift collar. In addition, the first gear 220 may be decoupled from the drive pinion 30 and may be rotatable with respect to the drive pinion 30. As such, a clutch or shift collar 310 may not connect the first gear 220 to the drive pinion 30 or the drive pinion extension 90. The drive pinion extension 90, if provided, may be received inside the first gear 220 and may be spaced apart from the first gear 220. In at least one configuration, the first gear 220 may be axially positioned along the axis 70 between the second gear 222 and the electric motor module 26.

Figure 7:
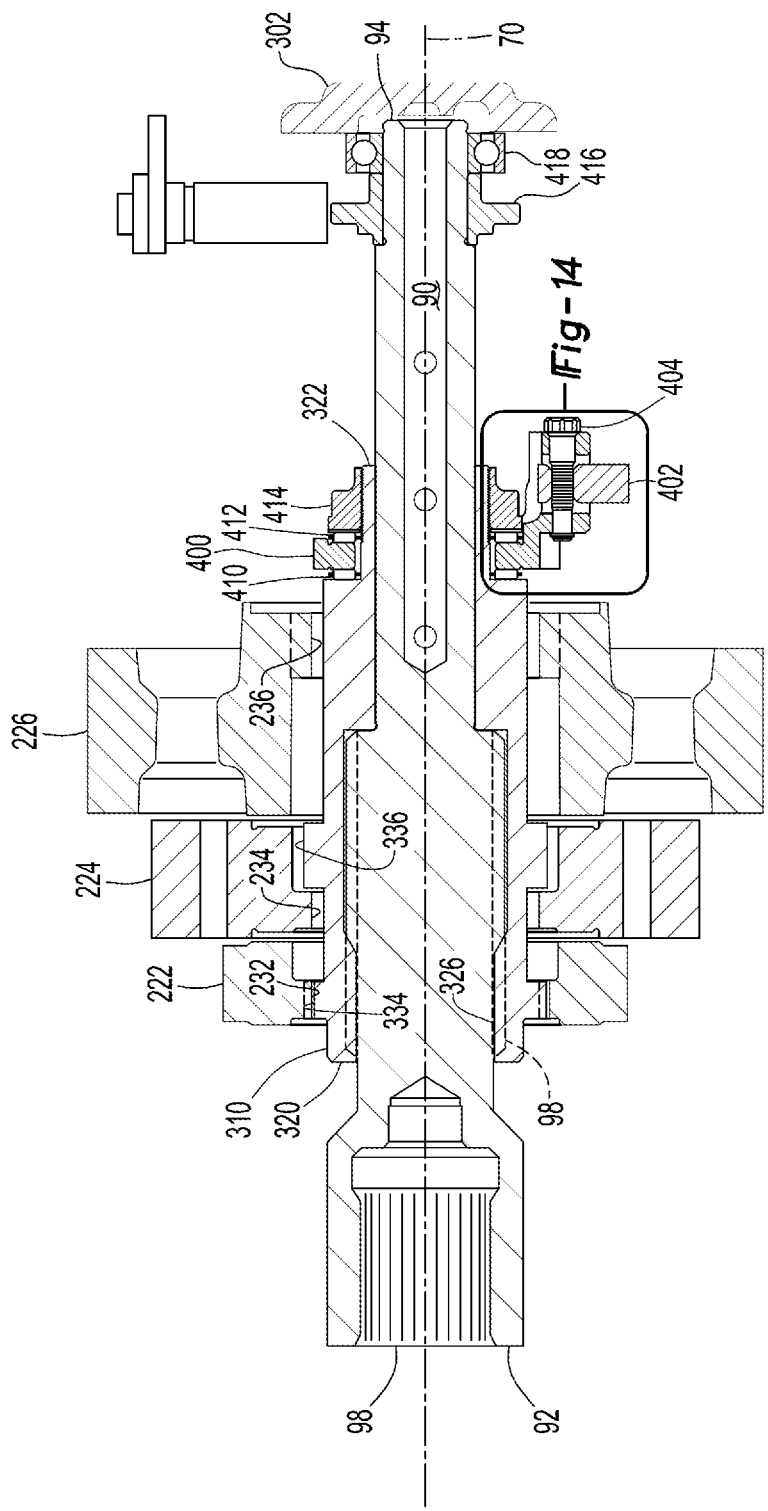
FIG. 7 is a section view of a portion of the axle assembly with the shift collar of FIG. 5 in a first position.

Referring to FIGS. 5 and 7, the second gear 222 may extend around the axis 70. In at least one configuration, the second gear 222 may have a through hole that may receive the drive pinion 30, the drive pinion extension 90, or both. The second gear 222 may have a plurality of teeth that may be arranged around and may extend away from the axis 70. The teeth of the second gear 222 may contact and may mate or mesh with teeth of a second countershaft gear that may be provided with the first countershaft gear set 212 and the second countershaft gear set 214 as will be discussed in more detail below. As is best shown in FIG. 7, the second gear 222 may also have inner gear teeth 232 that may extend toward the axis 70 and may be received in the through hole. The second gear 222 may have a different diameter than the first gear 220. For example, the second gear 222 may have a larger diameter than the first gear 220 as is best shown in FIG. 5. In at least one configuration, the second gear 222 may be axially positioned along the axis 70 between the first gear 220 and the third gear 224. The drive pinion 30 or drive pinion extension 90, if provided, may be received inside the second gear 222 and may be spaced apart from the second gear 222 in one or more configurations.

Referring to FIGS. 5 and 7, the third gear 224 may extend around the axis 70. In at least one configuration, the third gear 224 may have a through hole that may receive the drive pinion 30, the drive pinion extension 90, or both. The third gear 224 may have a plurality of teeth that may be arranged around and may extend away from the axis 70. The teeth of the third gear 224 may contact and may mate or mesh with teeth of a third countershaft gear that may be provided with the first countershaft gear set 212 and the second countershaft gear set 214 as will be discussed in more detail below. As is best shown in FIG. 7, the third gear 224 may also have inner gear teeth 234 that may extend toward the axis 70 and may be received in the through hole. The third gear 224 may have a different diameter than the first gear 220 and the second gear 222. For example, the third gear 224 may have a larger diameter than the first gear 220 and the second gear 222 as is best shown in FIG. 5. In at least one configuration, the third gear 224 be axially positioned along the axis 70 between the second gear 222 and the fourth gear 226. The drive pinion 30 or drive pinion extension 90, if provided, may be received inside the third gear 224 and may be spaced apart from the third gear 224 in one or more configurations.

Referring to FIGS. 5 and 7, the fourth gear 226 may extend around the axis 70. In at least one configuration, the fourth gear 226 may have a through hole that may receive the drive pinion 30, the drive pinion extension 90, or both. The fourth gear 226 may have a plurality of teeth that may be arranged around and may extend away from the axis 70. The teeth of the fourth gear 226 may contact and may mate or mesh with teeth of a fourth countershaft gear that may be provided with the first countershaft gear set 212 and the second countershaft gear set 214 as will be discussed in more detail below. As is best shown in FIG. 7, the fourth gear 226 may also have inner gear teeth 236 that may extend toward the axis 70 and may be received in the through hole. The fourth gear 226 may have a different diameter than the first gear 220, the second gear 222, and the third gear 224, such as a larger diameter. In at least one configuration, the fourth gear 226 be axially positioned along the axis 70 further from the electric motor module 26 than the first gear 220, the second gear 222, and the third gear 224. As such, the fourth gear 226 may be axially positioned proximate or adjacent to a side of the second transmission housing 202 that is disposed opposite the first transmission housing 200. The drive pinion 30 or drive pinion extension 90 may be received inside the fourth gear 226 and may be spaced apart from the fourth gear 226 in one or more configurations.

Referring to FIG. 5, thrust bearings 240 may optionally be provided between members of the set of drive pinion gears 210, between the first transmission housing 200 and the set of drive pinion gears 210, between the second transmission housing 202 and the set of drive pinion gears 210, or combinations thereof. For instance, a first thrust bearing 240 may be axially positioned between the first transmission housing 200 and the first gear 220, a second thrust bearing 240 may be axially positioned between the first gear 220 and the second gear 222, a third thrust bearing 240 may be axially positioned between the second gear 222 and the third gear 224, a fourth thrust bearing 240 may be axially positioned between the third gear 224 and the fourth gear 226, and a fifth thrust bearing 240 may be axially positioned between the fourth gear 226 and the second transmission housing 202.

The first countershaft gear set 212 may be received in the transmission housing cavity 206 and may be in meshing engagement with the set of drive pinion gears 210. The first countershaft gear set 212 may be rotatable about a first countershaft axis 250. The first countershaft axis 250 may be disposed parallel or substantially parallel to the axis 70 in one or more embodiments. The first countershaft gear set 212 may include a first countershaft 260 and a plurality of gears. In the configuration shown, the plurality of gears of the first countershaft gear set 212 include a first countershaft gear 270, a second countershaft gear 272, a third countershaft gear 274, and a fourth countershaft gear 276; however, it is contemplated that a greater number of countershaft gears or a lesser number of countershaft gears may be provided.

The first countershaft 260 may be rotatable about the first countershaft axis 250. For instance, the first countershaft 260 may be rotatably supported on the first transmission housing 200 and the second transmission housing 202 by corresponding bearing assemblies 280. For example, first and second bearing assemblies 280 may be located near opposing first and second ends the first countershaft 260, respectively. The first countershaft 260 may support and be rotatable with the first countershaft gear 270, the second countershaft gear 272, the third countershaft gear 274, and the fourth countershaft gear 276.

The first countershaft gear 270 may be fixedly disposed on the first countershaft 260 or fixedly mounted to the first countershaft 260. As such, the first countershaft gear 270 may rotate about the first countershaft axis 250 with the first countershaft 260 and may not be rotatable with respect to the first countershaft 260. For example, the first countershaft gear 270 may have a hole that may receive the first countershaft 260 and may be fixedly coupled to the first countershaft 260. The first countershaft gear 270 may extend around the first countershaft axis 250 and may have a plurality of teeth that may be arranged around and may extend away from the first countershaft axis 250. The teeth of the first countershaft gear 270 may contact and may mate or mesh with the teeth of the first gear 220. In at least one configuration, the first countershaft gear 270 may be axially positioned along the first countershaft axis 250 between the first transmission housing 200 and the second countershaft gear 272 of the first countershaft gear set 212.

The second countershaft gear 272 may be fixedly disposed on the first countershaft 260 or fixedly mounted to the first countershaft 260. As such, the second countershaft gear 272 may rotate about the first countershaft axis 250 with the first countershaft 260 and may not be rotatable with respect to the first countershaft 260. For example, the second countershaft gear 272 may have a hole that may receive the first countershaft 260 and may be fixedly coupled to the first countershaft 260. The second countershaft gear 272 may extend around the first countershaft axis 250 and may have a plurality of teeth that may be arranged around and may extend away from the first countershaft axis 250. The teeth of the second countershaft gear 272 may contact and may mate or mesh with the teeth of the second gear 222. The second countershaft gear 272 may have a different diameter than the first countershaft gear 270 and the third countershaft gear 274. In at least one configuration, the second countershaft gear 272 may be axially positioned along the first countershaft axis 250 between the first countershaft gear 270 of the first countershaft gear set 212 and the third countershaft gear 274 of the first countershaft gear set 212.

The third countershaft gear 274 may be fixedly disposed on the first countershaft 260 or fixedly mounted to the first countershaft 260. As such, the third countershaft gear 274 may rotate about the first countershaft axis 250 with the first countershaft 260 and may not be rotatable with respect to the first countershaft 260. For example, the third countershaft gear 274 may have a hole that may receive the first countershaft 260 and may be fixedly coupled to the first countershaft 260. The third countershaft gear 274 may extend around the first countershaft axis 250 and may have a plurality of teeth that may be arranged around and may extend away from the first countershaft axis 250. The teeth of the third countershaft gear 274 may contact and may mate or mesh with the teeth of the third gear 224. The third countershaft gear 274 may have a different diameter than the first countershaft gear 270 and the second countershaft gear 272. In at least one configuration, the third countershaft gear 274 may be axially positioned along the first countershaft axis 250 between the second countershaft gear 272 of the first countershaft gear set 212 and the fourth countershaft gear 276 of the first countershaft gear set 212.

The fourth countershaft gear 276 may be fixedly disposed on the first countershaft 260 or fixedly mounted to the first countershaft 260. As such, the fourth countershaft gear 276 may rotate about the first countershaft axis 250 with the first countershaft 260 and may not be rotatable with respect to the first countershaft 260. For example, the fourth countershaft gear 276 may have a hole that may receive the first countershaft 260 and may be fixedly coupled to the first countershaft 260 or may be integrally formed with the first countershaft 260. The fourth countershaft gear 276 may extend around the first countershaft axis 250 and may have a plurality of teeth that may be arranged around and may extend away from the first countershaft axis 250. The teeth of the fourth countershaft gear 276 may contact and may mate or mesh with the teeth of the fourth gear 226. The fourth countershaft gear 276 may have a different diameter than the first countershaft gear 270, the second countershaft gear 272, and the third countershaft gear 274. In at least one configuration, the fourth countershaft gear 276 may be axially positioned along the first countershaft axis 250 further from the electric motor module 26 than the third countershaft gear 274 of the first countershaft gear set 212.

The second countershaft gear set 214, if provided, may be received in the transmission housing cavity 206 and may be rotatable about a second countershaft axis 250'. The second countershaft axis 250' may be disposed parallel or substantially parallel to the axis 70 and the first countershaft axis 250 in one or more embodiments. The second countershaft gear set 214 may generally be disposed on an opposite side of the axis 70 from the first countershaft gear set 212 or may be disposed such that the first countershaft axis 250 and the second countershaft axis 250' may be disposed at a common radial distance from the axis 70. The first and second countershaft gear sets 212, 214 may be positioned at any suitable rotational angle or position about the axis 70.

The second countershaft gear set 214 may have the same or substantially the same configuration as the first countershaft gear set 212. For example, the second countershaft gear set 214 may include a second countershaft 260' that may be analogous to or may have the same structure as the first countershaft 260. In addition, the second countershaft gear set 214 may include a plurality of gears that are rotatable with the second countershaft 260'. In the configuration shown, the plurality of gears of the second countershaft gear set 214 include a first countershaft gear 270', a second countershaft gear 272', a third countershaft gear 274', and a fourth countershaft gear 276'; however, it is contemplated that a greater number of gears or a lesser number of gears may be provided. The first countershaft gear 270', second countershaft gear 272', third countershaft gear 274', and the fourth countershaft gear 276' of the second countershaft gear set 214 may be analogous to or may have the same structure as the first countershaft gear 270, second countershaft gear 272, third countershaft gear 274, and the fourth countershaft gear 276, respectively, of the first countershaft gear set 212. The first countershaft gear 270', second countershaft gear 272', third countershaft gear 274', and the fourth countershaft gear 276' may be arranged along and may be rotatable about a second countershaft axis 250' rather than the first countershaft axis 250 and may be fixed to the second countershaft 260' rather than the first countershaft 260.

The first gear 220 and the first countershaft gears 270, 270' may provide a different gear ratio than the second gear 222 and the second countershaft gears 272, 272', the third gear 224 and the third countershaft gears 274, 274', and the fourth gear 226 and the fourth countershaft gears 276, 276'. Gear ratios may be provided that are greater than 1:1, less than 1:1, equal (i.e., 1:1), or combinations thereof.

The teeth of the drive pinion gears and the countershaft gears may be of any suitable type. As a non-limiting example, the meshing teeth of the members of the set of drive pinion gears 210, the gears of the first countershaft gear set 212, and the gears of the second countershaft gear set 214 may have a helical configuration.

Shift Mechanism

Figure 3:
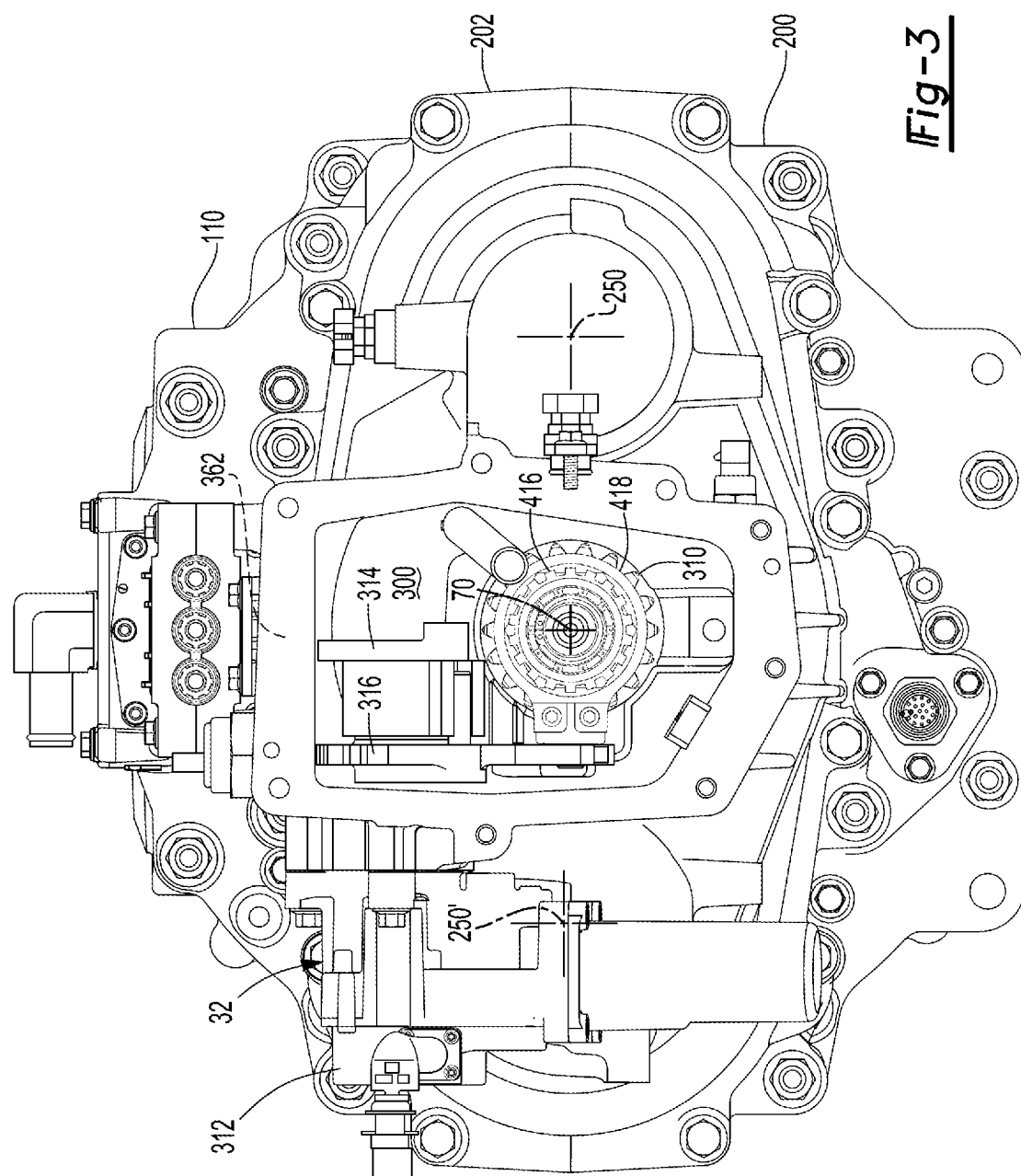
FIG. 3 is an end view of the axle assembly with a cover at the end of the axle assembly removed.
Figure 4:
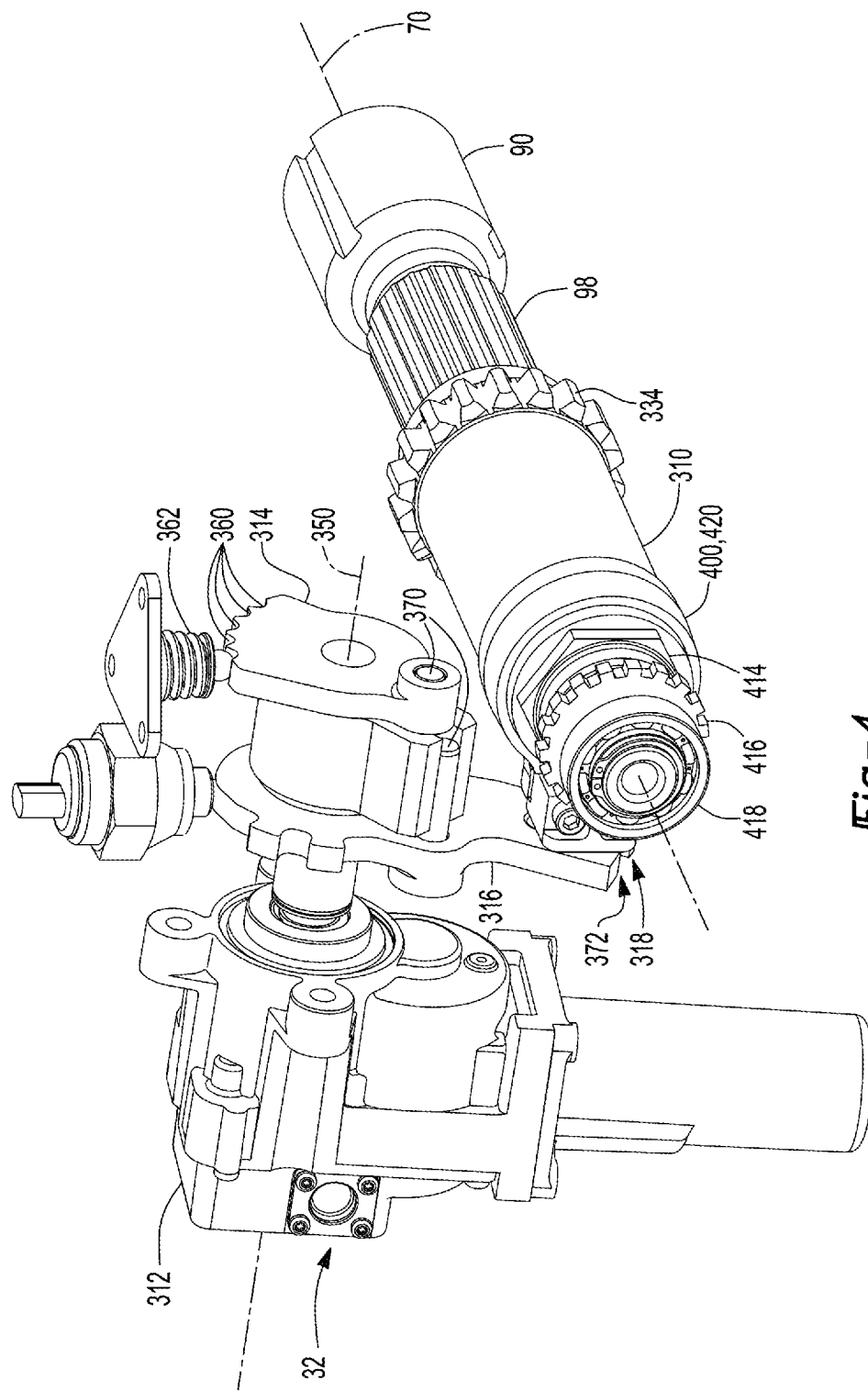
FIG. 4 is a perspective view that includes an example of a shift mechanism that may be provided with the axle assembly and a first configuration of a shift collar.

Referring primarily to FIGS. 2-4, the shift mechanism 32 may selectively connect the transmission module 28 and the drive pinion 30. For example, the shift mechanism 32 may operatively connect a member of the set of drive pinion gears 210 to the drive pinion 30 to provide torque at a desired gear ratio, and hence may change the torque transmitted between the electric motor module 26 and the differential assembly 22. The shift mechanism 32 may couple one member of the set of drive pinion gears 210 at a time to the drive pinion 30. The member of the set of drive pinion gears 210 that is coupled to the drive pinion 30 may be rotatable about the axis 70 with the drive pinion 30.

The shift mechanism 32 may be received in or partially received in a shift mechanism housing cavity 300, which is best shown in FIGS. 2 and 3. The shift mechanism housing cavity 300 may be partially defined by the second transmission housing 202 and may be disposed proximate an end of the axle assembly 10. Referring to FIGS. 1 and 2, a cover 302 may be mounted on the end of the second transmission housing 202 to help enclose the shift mechanism housing cavity 300. The cover 302 is removed in FIG. 3.

The shift mechanism 32 may have any suitable configuration. In at least one configuration such as is shown in FIGS. 4 and 6, the shift mechanism 32 may include a shift collar 310, an actuator 312, a detent linkage 314, a linkage 316, and an adjuster mechanism 318.

The shift collar 310 may be rotatable about the axis 70 with the drive pinion 30. In addition, the shift collar 310 may be moveable along the axis 70 with respect to the drive pinion 30. The shift collar 310 may selectively connect a member of the set of drive pinion gears 210 to the drive pinion 30 as will be discussed in more detail below. The shift collar 310 may be at least partially received in the shift mechanism housing cavity 300 and may be extendable through components of the transmission 204, such as the set of drive pinion gears 210. In at least one configuration, the shift collar 310 may include a first end 320, a second end 322, a shift collar hole 324, and a shift collar spline 326. The shift collar 310 may also include a first tubular shift collar portion 330, a second tubular shift collar portion 332, a first shift collar gear 334, a second shift collar gear 336, a threaded portion 338 or combinations thereof.

The first end 320 may face toward the drive pinion 30. In addition, the first end 320 may be disposed adjacent to the drive pinion 30 or the drive pinion extension 90.

The second end 322 may be disposed opposite the first end 320. As such, the second end 322 may face away from the drive pinion 30.

The shift collar hole 324 may extend along the axis 70 between the first end 320 and the second end 322. In at least one configuration, the shift collar hole 324 may be configured as a through hole that may extend from the first end 320 to the second end 322. The drive pinion 30 or the drive pinion extension 90 may be received inside the shift collar hole 324.

The shift collar spline 326 may couple the shift collar 310 to the drive pinion 30 or the drive pinion extension 90. The shift collar spline 326 may be disposed in the shift collar hole 324 and may be axially positioned near the first end 320. The shift collar spline 326 may extend toward the axis 70 and may mate with a spline of the drive pinion 30 or the spline 98 of the drive pinion extension 90 that may have spline teeth that may extend away from the axis 70. The mating splines may allow the shift collar 310 to move in an axial direction or along the axis 70 while inhibiting rotation of the shift collar 310 about the axis 70 with respect to the drive pinion 30. Thus, the shift collar 310 may be rotatable about the axis 70 with the drive pinion 30 when the shift collar spline 326 mates with the spline of the drive pinion 30 or the drive pinion extension 90.

The first tubular shift collar portion 330 may extend from the first end 320 toward the second end 322. The first tubular shift collar portion 330 may have a hollow tubular configuration and may be at least partially received inside the set of drive pinion gears 210 of the transmission 204. The first tubular shift collar portion 330 may have a larger outside diameter than the second tubular shift collar portion 332.

The second tubular shift collar portion 332, if provided, may extend from the second end 322 toward the first tubular shift collar portion 330 or to the first tubular shift collar portion 330. For instance, the second tubular shift collar portion 332 may have a hollow tubular configuration and may be at least partially disposed outside of the set of drive pinion gears 210.

The first shift collar gear 334 may be disposed between the first end 320 and the second end 322 of the shift collar 310. In at least one configuration, the first shift collar gear 334 may be disposed opposite the shift collar hole 324 and may extend from the first tubular shift collar portion 330. The first shift collar gear 334 may have teeth that may be arranged around the axis 70 and that may extend away from the axis 70 and away from the shift collar hole 324. The shift collar spline 326 may be disposed opposite the first shift collar gear 334. It is noted that an example of a shift collar 310 that has a first shift collar gear 334 but not a second shift collar gear 336 is shown in FIGS. 2 and 4 while an example of a shift collar 310 that has a first shift collar gear 334 and a second shift collar gear 336 is shown in FIGS. 5-11.

Referring to FIG. 6, the second shift collar gear 336, if provided, may be spaced apart from the first shift collar gear 334. The second shift collar gear 336 may be axially positioned between the first end 320 and the second end 322. For instance, the second shift collar gear 336 may be axially positioned between the first shift collar gear 334 and the second tubular shift collar portion 332. In at least one configuration, the second shift collar gear 336 may be disposed opposite the shift collar hole 324 and may extend from the first tubular shift collar portion 330. The second shift collar gear 336 may have teeth that may be arranged around the axis 70 and that may extend away from the axis 70 and away from the shift collar hole 324. The second shift collar gear 336 may have a similar configuration as the first shift collar gear 334 or a different configuration. For instance, the teeth of the second shift collar gear 336 may have a greater axial length than the teeth of the first shift collar gear 334 to increase torque transmission capacity, reduce shift execution time, or both as will be discussed in more detail below. The shift collar spline 326 may not be disposed opposite the second shift collar gear 336 in one or more embodiments.

The threaded portion 338 may be axially positioned between the first end 320 and the second end 322. For instance, the threaded portion 338 may be provided with the second tubular shift collar portion 332 and may be axially positioned between the first tubular shift collar portion 330 and the second end 322. The threaded portion 338 may be disposed on an exterior side of the second tubular shift collar portion 332 that may face away from the axis 70. It is also contemplated that the threaded portion 338 may be omitted.

Referring to FIGS. 3 and 4, the actuator 312 may be configured to move the shift collar 310 along the axis 70 to selectively connect a member of the set of drive pinion gears 210 to the drive pinion 30. The actuator 312 may be of any suitable type, such as an electrical, electromechanical, or mechanical actuator. In at least one configuration, the actuator 312 may be mounted to the second transmission housing 202. A portion of the actuator 312 may be rotatable about an actuator axis 350. For instance, the actuator 312 may have an actuator shaft that may extend along the actuator axis 350 and may be rotatable about the actuator axis 350. The actuator shaft may be operatively connected to the detent linkage 314.

Referring to FIG. 4, the detent linkage 314 may be fixedly coupled to the actuator 312. For instance, the detent linkage 314 may be coupled to the actuator shaft and may be rotatable about the actuator axis 350 with the actuator shaft. The detent linkage 314 may define a plurality of recesses 360. The recesses 360 may be configured to receive a detent feature 362. The detent feature 362 may inhibit rotation of the detent linkage 314 about the actuator axis 350 when the detent feature 362 is received in a recess 360. For example, rotation of the detent linkage 314 may be inhibited when the detent feature 362 is in a recess 360 and a sufficient actuation force is not provided by the actuator 312 to overcome the rotational resistance exerted by the detent feature 362. The detent linkage 314 may also be fixedly positioned with respect to the linkage 316. As such, the detent feature 362 may inhibit movement of the linkage 316.

The linkage 316 may operatively connect the actuator 312 to the shift collar 310 and the adjuster mechanism 318. In at least one configuration, the linkage 316 may be positioned along the actuator axis 350 closer to the actuator 312 than the detent linkage 314 is positioned to the actuator 312. The linkage 316 may be coupled to the actuator 312 and the detent linkage 314 such that the linkage 316 may be rotatable about the actuator axis 350 with the actuator shaft and the detent linkage 314. For example, the linkage 316 may be coupled to the detent linkage 314 with one or more fasteners 370, such as pins or bolts. It is also contemplated that the detent linkage 314 and the linkage 316 may be integrally formed. In at least one configuration, the linkage 316 may include an opening 372 that may facilitate coupling of the linkage 316 to the adjuster mechanism 318.

Figure 12:
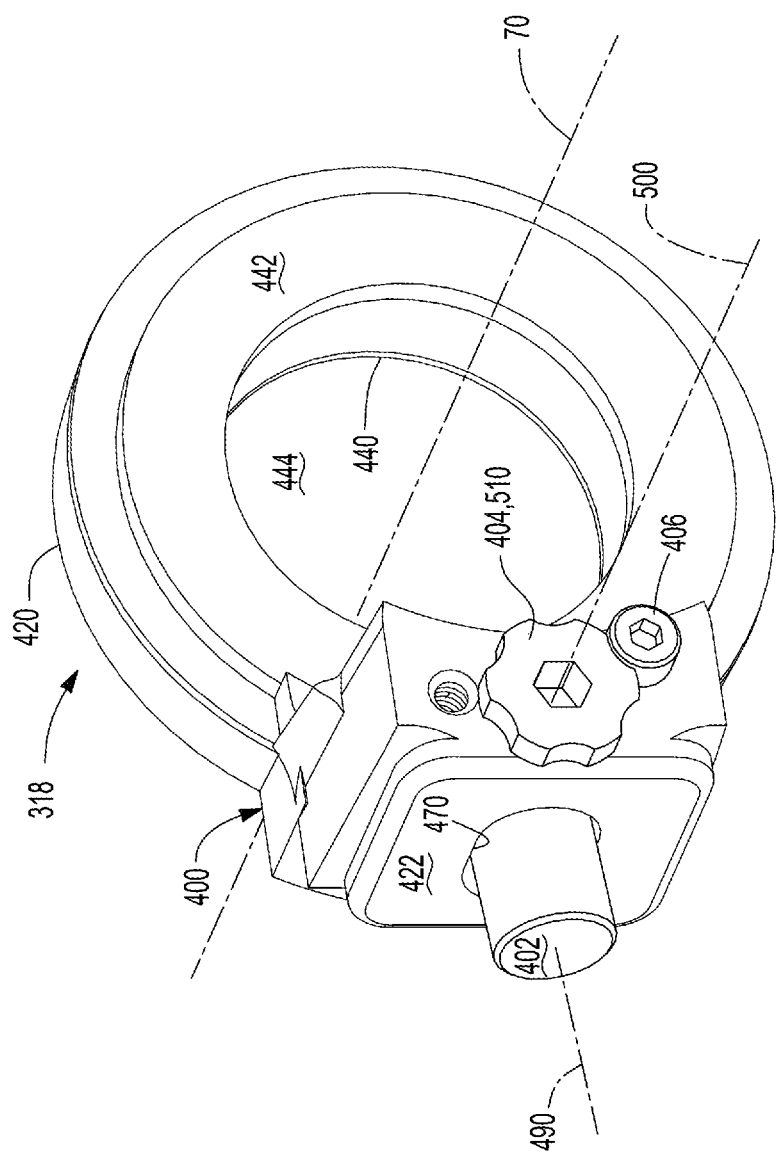
FIG. 12 is a perspective view of an example of an adjuster mechanism that may be provided with the shift mechanism.
Figure 13:
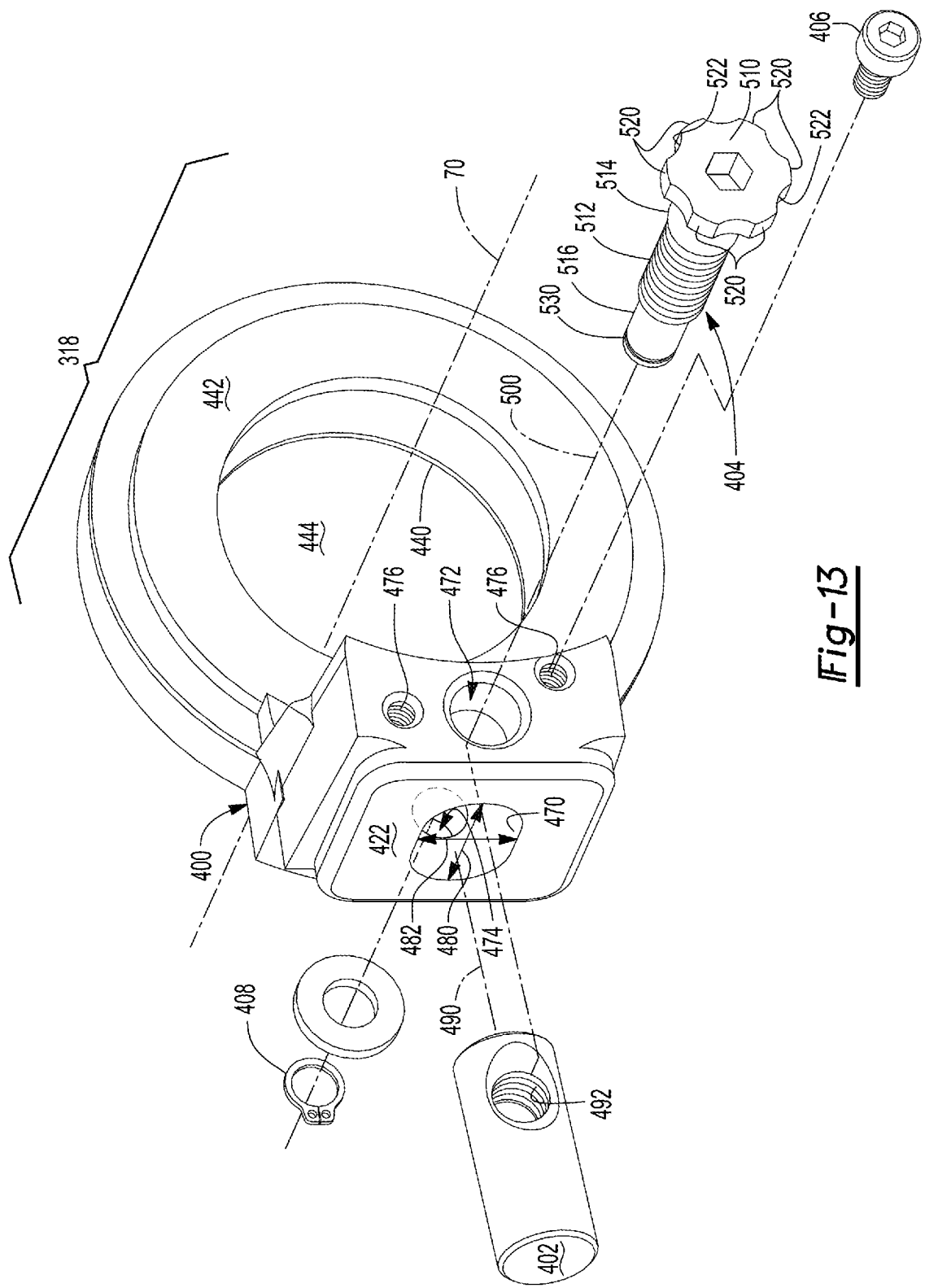
FIG. 13 is an exploded view of the adjuster mechanism shown in FIG. 12.

Referring to FIGS. 6, 12 and 13, the adjuster mechanism 318 may connect the linkage 316 to the shift collar 310. In addition, the adjuster mechanism 318 may allow the axial position of the shift collar 310 to be adjusted independent of operation of the actuator 312 or without rotating the components of the shift mechanism 32 like the actuator shaft, detent linkage 314, and linkage 316 about the actuator axis 350. In at least one configuration, the adjuster mechanism 318 may include a collar assembly 400, a follower 402, and an adjustment screw 404. The adjuster mechanism 318 may also include a locking screw 406 and a retainer 408. As is best shown in FIG. 6, a first thrust bearing 410, a second thrust bearing 412, a retainer nut 414, or combinations thereof may optionally be associated with or disposed adjacent to the adjuster mechanism 318. It is also contemplated that the adjuster mechanism 318 may be omitted or reconfigured to omit components such as the adjustment screw 404, locking screw 406, and retainer 408. For instance, the collar assembly 400 may be provided with a collar 420 and a shift block 422 that may be separate components that may be fastened together such that spacers or shims may be provided between the collar 420 and shift block 422 to adjust the axial positioning of the shift collar 310. It is also contemplated that the adjuster mechanism 318 may be provided with other configurations, such as when a shift fork is used to operatively connect a shift collar to an actuator.

The collar assembly 400 may receive the shift collar 310. In at least one configuration, the collar assembly 400 may include a collar 420 and a shift block 422.

The collar 420 may extend at least partially around the axis 70 in the shift collar 310. For instance, the collar 420 may be configured as a ring that may extend around the axis 70. In at least one configuration, the collar 420 may include a first collar side 440, a second collar side 442, and a collar hole 444.

The first collar side 440 may face toward the transmission module 28, the drive pinion 30, or both.

The second collar side 442 may be disposed opposite the first collar side 440. As such, the second collar side 442 may face away from the transmission module 28, the drive pinion 30, or both.

The collar hole 444 may extend between the first collar side 440 and the second collar side 442. The collar hole 444 may be a through hole that may extend through the collar 420. The shift collar 310 may be received inside the collar hole 444 and may be rotatable about the axis 70 with respect to the collar 420. For instance, the second tubular shift collar portion 332 may be received inside the collar hole 444 and may extend through the collar hole 444. In at least one configuration, the collar hole 444 may receive a bearing assembly that may be positioned between the shift collar 310 and the collar 420. For example, the bearing assembly may extend from an outside circumference of the second tubular shift collar portion 332 to the inside diameter of the collar 420 that defines the collar hole 444.

The shift block 422 may be fixedly positioned with respect to the collar 420. The shift block 422 may be integrally formed with the collar 420 or may be provided as a separate component that is attached to the collar 420. For instance, the shift block 422 may extend from an outside circumference of the collar 420, the second collar side 442, or combinations thereof. In at least one configuration and as is best shown in FIGS. 12 and 13, the shift block 422 may define an elongated slot 470 and a first hole 472. The shift block 422 may also define a second hole 474, at least one locking screw hole 476, or combinations thereof.

The elongated slot 470 may be open in at least a direction that extends away from the axis 70. The elongated slot 470 may receive the follower 402 with a clearance fit and may be configured to allow the collar assembly 400 to move in an axial direction or along the axis 70 with respect to the follower 402. The elongated slot 470 may be longer in a direction that may extend parallel to the axis 70. In at least one configuration, the elongated slot 470 may have a major axis 480 and a minor axis 482.

The major axis 480 may extend parallel or substantially parallel to the axis 70. For instance, the major axis 480 may extend from the first hole 472 toward or to the second hole 474. The major axis 480 may have a greater length than the minor axis 482. As such, the elongated slot 470 may extend a greater distance along the major axis 480 than along the minor axis 482.

The minor axis 482 may be disposed substantially perpendicular to the major axis 480. For instance, the minor axis 482 may extend in a substantially vertical direction from the perspective shown.

The first hole 472 may extend from the elongated slot 470. In at least one configuration, the first hole 472 may be a through hole that may extend through the shift block 422 from the elongated slot 470 to an exterior surface of the shift block 422. In at least one configuration, the first hole 472 may not be threaded and may extend substantially parallel to the major axis 480 of the elongated slot 470 and may be coaxially disposed with the major axis 480 of the elongated slot 470.

The second hole 474, if provided, may be coaxially disposed with the first hole 472. In the configuration shown, the second hole 474 is disposed closer to the shift collar 310 than the first hole 472; however, it is contemplated that the positioning of the first hole 472 and the second hole 474 may be reversed. The second hole 474 may extend from the elongated slot 470. In at least one configuration, the second hole 474 may be a through hole that may extend through the shift block 422 from the elongated slot 470 to an exterior surface of the shift block 422 that may be disposed opposite the first hole 472. In at least one configuration, the second hole 474 may not be threaded and may be coaxially disposed with the first hole 472. The second hole 474 may extend substantially parallel to the major axis 480 of the elongated slot 470 and may be coaxially disposed with the major axis 480 of the elongated slot 470. In at least one configuration, the second hole 474 may have a smaller diameter than the first hole 472. Alternatively, the second hole 474 may have the same diameter or a larger diameter than the first hole 472.

One or more locking screw holes 476 may be spaced apart from the first hole 472, the second hole 474, or both. In the configuration shown, the locking screw hole 476 is disposed proximate the first hole 472 and is spaced apart from the first hole 472. The locking screw hole 476 may receive the locking screw 406. In at least one configuration, the locking screw hole 476 may be a blind hole, a threaded hole, or both.

The follower 402 may connect or couple the linkage 316 to the collar assembly 400. As such, the follower 402 may help operatively connect the actuator 312 to the collar assembly 400. In at least one embodiment, the follower 402 may be configured as a generally cylindrical pin that may extend along a follower axis 490. The follower axis 490 may be disposed substantially perpendicular to the axis 70 and substantially perpendicular to the major axis 480 of the elongated slot 470. A portion of the follower 402 may be received in the opening 372 of the linkage 316 and another portion of the follower 402 may be received in the elongated slot 470. The follower 402 may be sized to fit within the elongated slot 470 such that the follower 402 may be moveable in the elongated slot 470 along the major axis 480. For instance, the follower 402 may have a width or diameter that may be less than the length of the major axis 480 of the elongated slot 470, the minor axis 482 of the elongated slot 470, or both. In at least one configuration, the follower 402 may define a threaded hole 492. The threaded hole 492 may be received in the elongated slot 470 and may be configured to receive the adjustment screw 404.

The adjustment screw 404 may couple the collar assembly 400 to the follower 402. For instance, the adjustment screw 404 may be received in the first hole 472 of the shift block 422 and the threaded hole 492 of the follower 402. The adjustment screw 404 may also be receivable in the second hole 474 of the shift block 422 if a second hole 474 is provided. The adjustment screw 404 may be rotatable about an adjustment screw axis 500, which may be disposed substantially parallel to and may be coaxial with the major axis 480 of the elongated slot 470. In at least one configuration and as is best shown in FIG. 13, the adjustment screw 404 may include a head 510, a threaded portion 512, a first shank portion 514, a second shank portion 516, or combinations thereof.

The head 510 may be disposed proximate an end of the adjustment screw 404. For instance, the head 510 may be disposed adjacent to the first hole 472 of the shift block 422 and may be disposed outside of the first hole 472. The head 510 may extend away from the axis 70 and may protrude from the first shank portion 514. In at least one configuration, the head 510 may include a plurality of teeth 520. The teeth 520 may be arranged around the adjustment screw axis 500 and may extend away from the adjustment screw axis 500. A recess or gap 522 may be provided between adjacent teeth 520. For clarity, only some of the gaps are labeled in FIG. 13.

The threaded portion 512 may be positioned along the adjustment screw axis 500 between the head 510 and a distal end of the adjustment screw 404. The threaded portion 512 may be received in the elongated slot 470. The threaded portion 512 may also be received in the threaded hole 492 in the follower 402.

The first shank portion 514 may extend between the head 510 and the threaded portion 512. The first shank portion 514 may be received in the first hole 472 of the shift block 422. The first shank portion 514 may be rotatable in the first hole 472 and may or may not be threaded.

The second shank portion 516, if provided, may extend between the threaded portion 512 and the distal end of the adjustment screw 404 that is disposed opposite the head 510. The second shank portion 516 may be received in the second hole 474 of the shift block 422. The second shank portion 516 may be rotatable in the second hole 474. In at least one configuration, the second shank portion 516 may protrude out of the second hole 474 and may include a groove or indentation 530 that may receive the retainer 408. Optionally, the second shank portion 516 may have a different diameter than the first shank portion 514, such as a smaller diameter, and may be threaded or unthreaded. It is also contemplated that the second shank portion 516 may be omitted, such as when the second hole 474 is not provided.

The locking screw 406 may inhibit rotation of the adjustment screw 404. For instance, the locking screw 406 may be partially received in the locking screw hole 476 of the shift block 422. A portion of the locking screw 406 that protrudes from and may not be received in the locking screw hole 476 may engage the adjustment screw 404. For example, the head of the locking screw 406 may engage the head 510 of the adjustment screw 404 and may be received in a gap 522 between adjacent teeth 520 of the head 510. As such, the locking screw 406 may engage the teeth 520 that are disposed adjacent to the gap 522 in which the locking screw 406 is received, thereby inhibiting rotation of the adjustment screw 404.

The retainer 408 may limit axial movement of the adjustment screw 404 along the adjustment screw axis 500. The retainer 408 may inhibit removal of the adjustment screw 404 from the shift block 422. The retainer 408 may have any suitable configuration. For example, the retainer 408 may be configured as a fastener such as a snap ring, such screw, retaining pin, washer, or the like. In at least one configuration, the retainer 408 may be mounted to the second shank portion 516 proximate the distal end of the adjustment screw 404. For instance, the retainer 408 may be received in the indentation 530 in the second shank portion 516 and may be disposed outside of the second hole 474.

Referring to FIG. 6, the first thrust bearing 410 may facilitate rotation of the shift collar 310 about the axis 70 with respect to the collar assembly 400. The first thrust bearing 410 may be axially positioned between the first collar side 440 and the shift collar 310. Optionally, washers may be axially positioned adjacent to one or both sides of the first thrust bearing 410.

The second thrust bearing 412 may facilitate rotation of the shift collar 310 about the axis 70 with respect to the collar assembly 400. The second thrust bearing 412 may be positioned between the second collar side 442 and the retainer nut 414. Optionally a washer may be axially positioned adjacent to one or both sides of the first thrust bearing 410. For example, a washer may be provided between the second thrust bearing 412 and the retainer nut 414.

The retainer nut 414 may be mounted to the shift collar 310. For instance, the retainer nut 414 may have a threaded hole that may receive the second tubular shift collar portion 332 and mate with the threaded portion 338 of the shift collar 310. The retainer nut 414 may inhibit axial movement of the shift collar 310 with respect to the collar 420 and may help secure the first thrust bearing 410 and the second thrust bearing 412. It is also contemplated that the retainer nut 414 may be omitted and a different fastener or fastening technique may be used. For instance, a fastener like a snap ring or a press-fit fastener may replace a threaded connection.

An encoder disc 416 may optionally be mounted to the drive pinion 30 or the drive pinion extension 90. In at least one configuration, the encoder disc 416 may be disposed adjacent to the retainer nut 414. For instance, the encoder disc 416 may be axially positioned between the retainer nut 414 and a support bearing 418 that rotatably supports the drive pinion 30 or drive pinion extension 90. For example, the support bearing 418 may be positioned between a shoulder of the drive pinion 30 or drive pinion extension 90 and the support bearing 418, if provided. The encoder disc 416 may have detectable features such as protrusions and/or recesses that may be detectable by a sensor to detect rotation or the rotational speed of the drive pinion 30.

The support bearing 418 may rotatably support the drive pinion 30 or drive pinion extension 90. For instance, the drive pinion 30 or drive pinion extension 90 may be received inside and may be rotatably supported by the support bearing 418, which in turn may be supported by the second transmission housing 202, the cover 302, or both.

Operation of the Adjuster Mechanism

The adjuster mechanism 318 may allow the shift collar 310 and the collar assembly 400 to be moved along the axis 70 to more precisely position the shift collar 310 with respect to the set of drive pinion gears 210 and their inner gear teeth. As such, the adjuster mechanism 318 may compensate for design tolerances, such as design tolerances that may be associated with the axial positioning of the drive pinion gears 210, the detent linkage 314, linkage 316, shimming of the thrust bearings 240, or combinations thereof. Axial alignment of the gear portion or gear portions of the shift collar 310 and the inner gear teeth of the set of drive pinion gears 210 may be adjusted, which may improve gear engagement and shifting accuracy when the shift collar 310 is shifted with the actuator 312. Proper axial adjustment may inhibit collar kick-out or help ensure that teeth of a gear portion or gear portions of the shift collar 310 remain engaged with a drive pinion gear and may help reduce tooth flank wear, including when teeth flanks have crowned profiles (e.g., mating concave and convex flanks). Axial adjustment of the shift collar 310 may also help properly position the shift collar 310 in a neutral position to help ensure that the shift collar 310 does not engage a member of the set of drive pinion gears 210. Such disengagement may help ensure that a spline of the shift collar 310 does not contact the spline of a drive pinion gear during synchronization and may help avoid spline damage. An example of how the adjuster mechanism 318 may be operated is as follows.

First, the detent feature 362, which is best shown in FIG. 4, may lock the detent linkage 314 so that the detent linkage 314 may be inhibited from rotating about the actuator axis 350 and so that the linkage 316 is held in a stationary position. The linkage 316 may then inhibit movement of the follower 402.

Next, the locking screw 406 may be disengaged from the adjustment screw 404. For instance, the locking screw 406 may be rotated to disengage the locking screw 406 from the head 510 of the adjustment screw 404.

Figure 14:
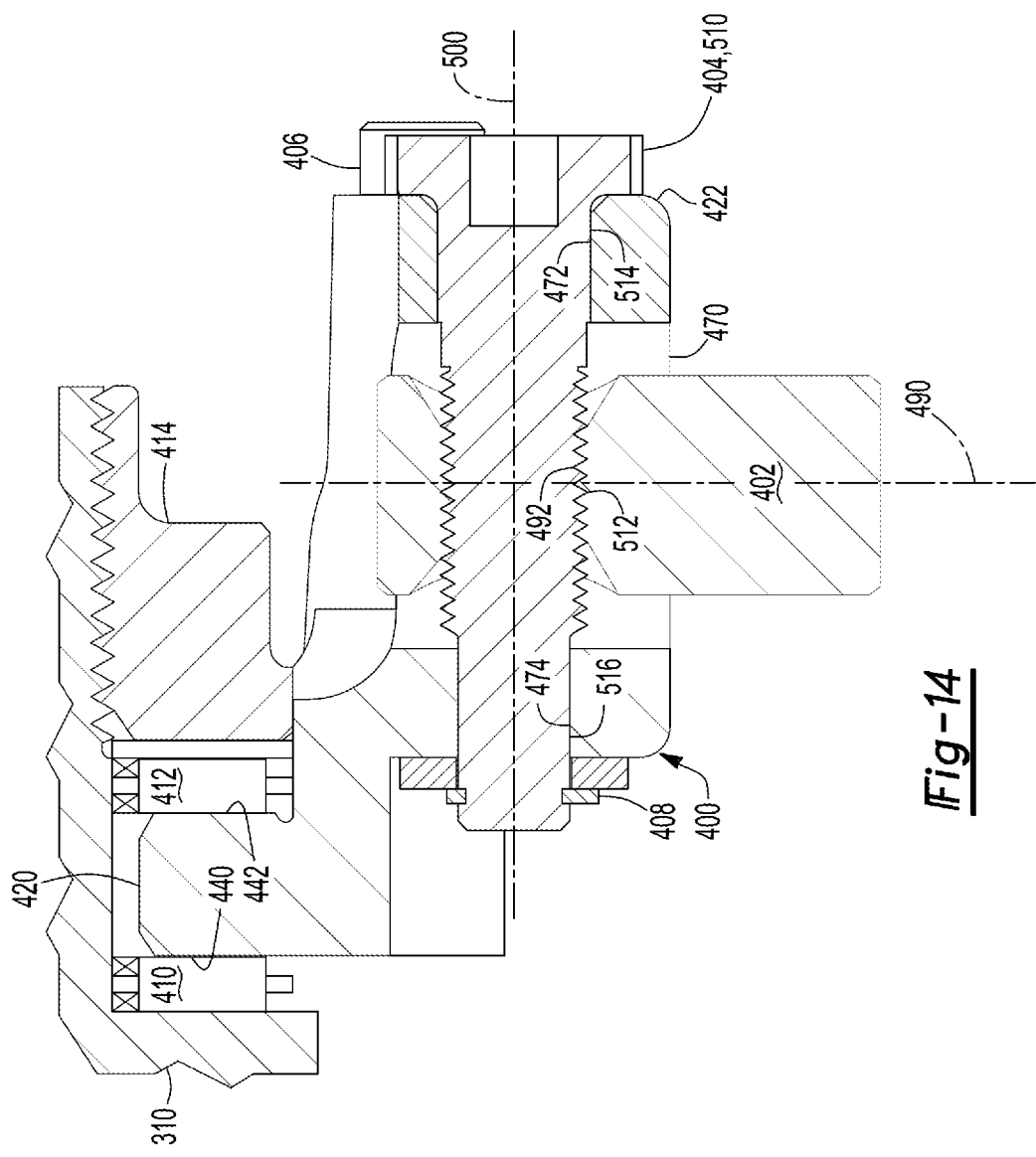
FIG. 14 is a magnified view of a portion of FIG. 7 that shows the adjuster mechanism in a nominal position.

Next, the adjustment screw 404 may be rotated about the adjustment screw axis 500. Rotating the adjustment screw 404 may cause the collar assembly 400 and the shift collar 310 to move along the axis 70 with respect to the follower 402. An example of such movement is shown by comparing FIG. 14 with FIG. 15. In FIG. 14, the collar assembly 400 is shown in a nominal position in which the follower 402 is generally centered in the elongated slot 470. Rotating the adjustment screw 404 in a first direction about the adjustment screw axis 500 may loosen the adjustment screw 404 with respect to the follower 402, thereby actuating the collar assembly 400 and the shift collar 310 along the axis 70 toward the cover 302, or to the right from the perspective shown and to or toward the position shown in FIG. 15. Conversely, rotating the adjustment screw 404 in a second direction about the adjustment screw axis 500 that is opposite the first direction may tighten the adjustment screw 404 and actuate the collar assembly 400 and the shift collar 310 along the axis 70 away from the cover 302. The adjustment screw 404 may be rotated to axially align the first shift collar gear 334 or second shift collar gear 336 with a member of the set of drive pinion gears 210.

Finally, the locking screw 406 may be tightened to engage the adjustment screw 404. For instance, the locking screw 406 may be received in the gap 522 in the head 510 of the adjustment screw 404 to inhibit rotation of the adjustment screw 404 about the adjustment screw axis 500 as previously discussed. The actuator 312 may then be subsequently used to move the shift collar 310 along the axis while the adjuster mechanism 318 may remain fixed and moves axially with the collar assembly 400.

It is also contemplated that the adjuster mechanism 318 may be provided to adjust the axial position of a shift collar that is provided with an axle assembly having any suitable configuration. For instance, the adjuster mechanism 318 may be provided with an axle assembly that does not have an electric motor module 26 or that has a transmission module with a different configuration, such as a planetary gear configuration.

Operation of the Shift Mechanism

Figure 8:
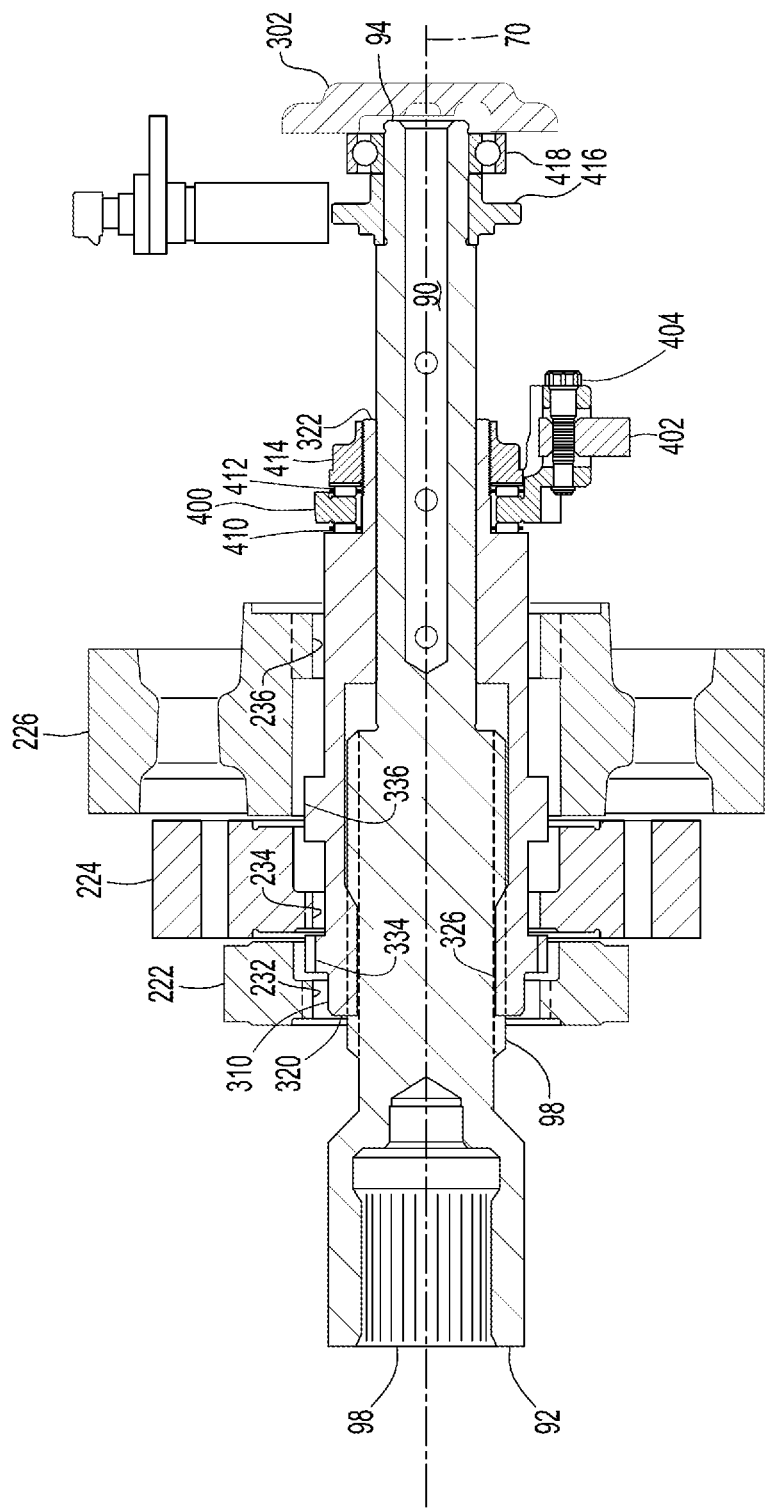
FIG. 8 is a section view of a portion of the axle assembly with the shift collar in a first neutral position.
Figure 9:
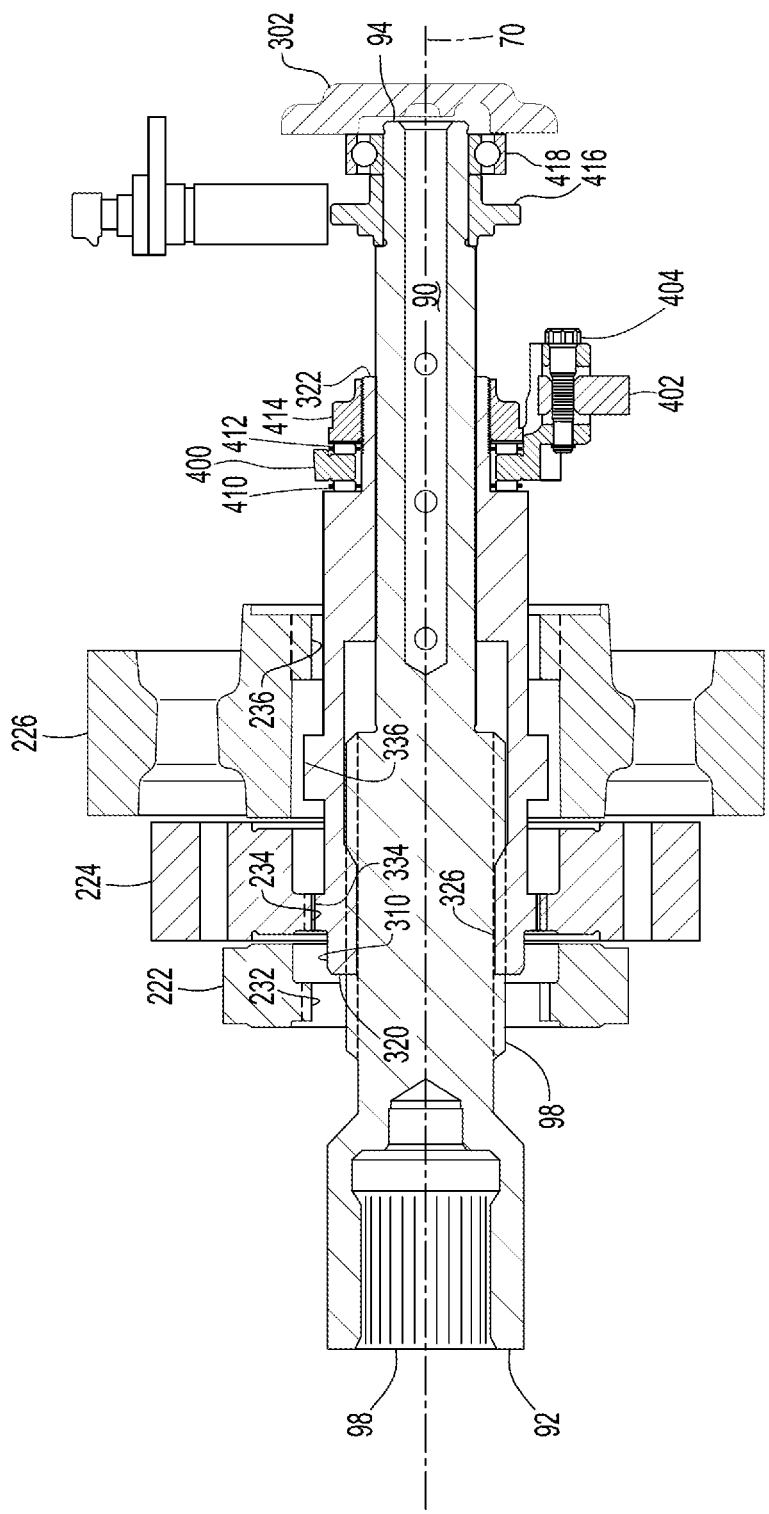
FIG. 9 is a section view of a portion of the axle assembly with the shift collar in a second position.
Figure 10:
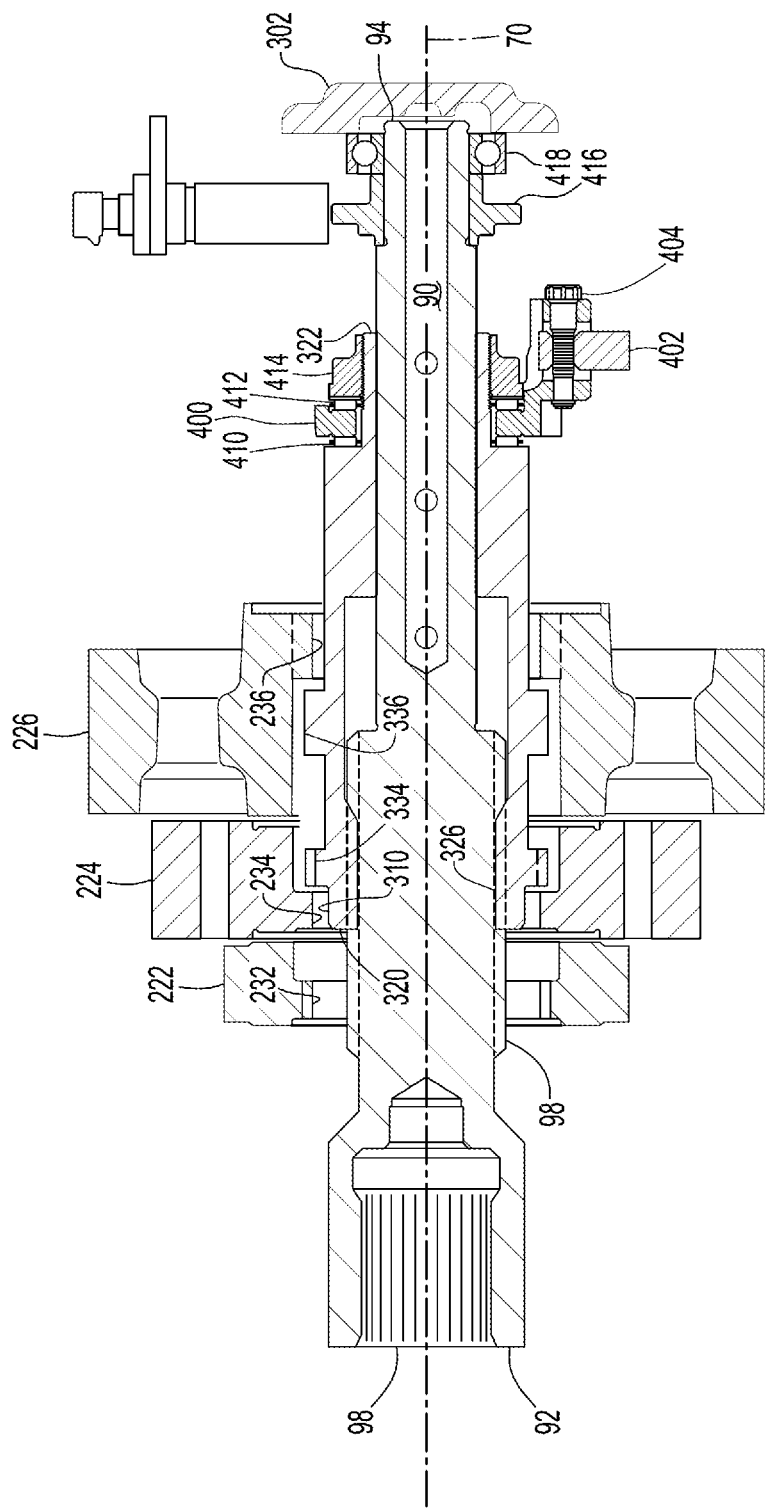
FIG. 10 is a section view of a portion of the axle assembly with the shift collar in a second neutral position.
Figure 11:
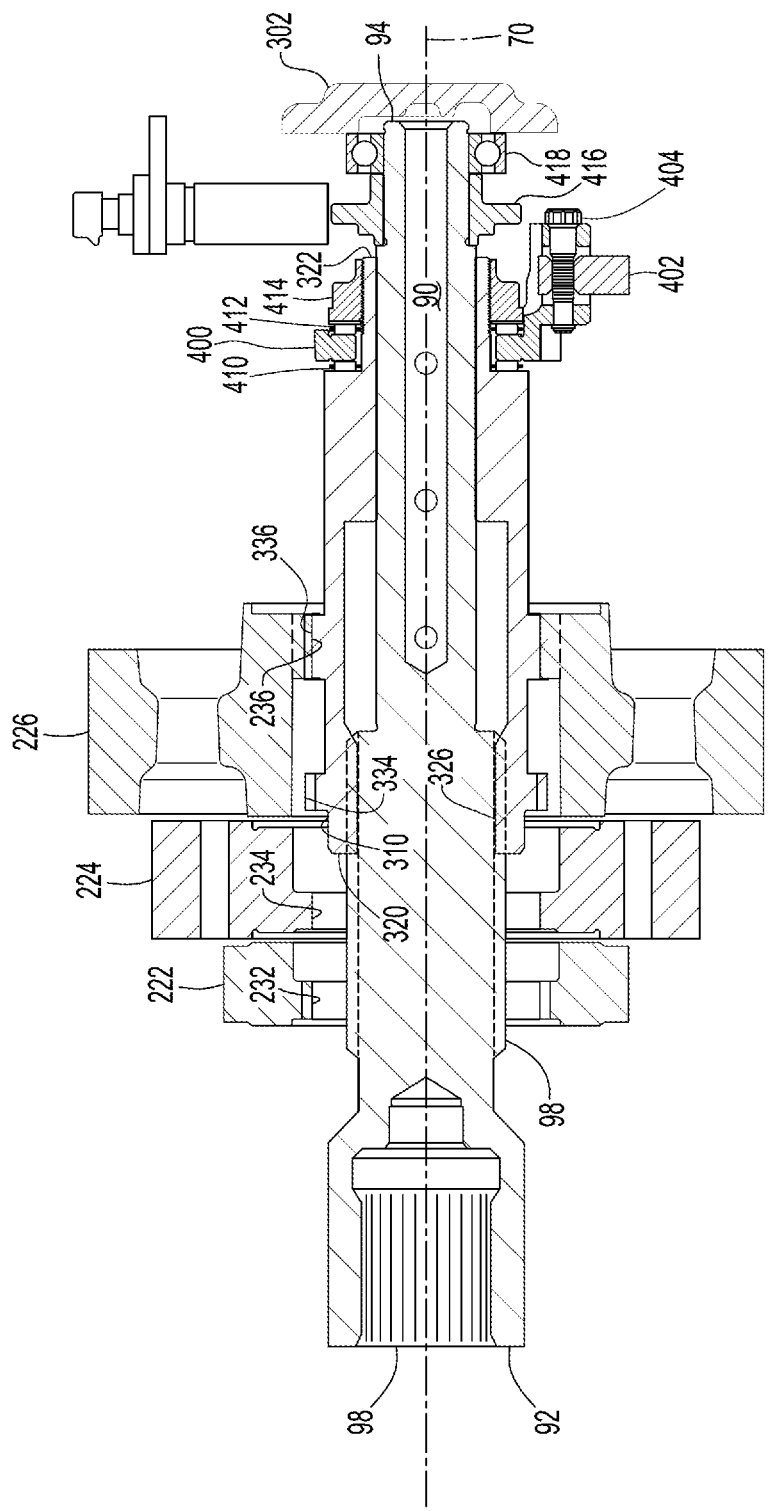
FIG. 11 is a section view of a portion of the axle assembly with the shift collar in a third position.

Referring to FIGS. 7-11, the actuator 312 may move the shift collar 310 along the axis 70 between a plurality of positions to selectively couple the shift collar 310 to the transmission 204 or to decouple the shift collar 310 from the transmission 204. For instance, the actuator 312 may move the shift collar 310 along the axis 70 between the first, second, and third positions. Examples of these positions are illustrated in FIGS. 7, 9, and 11. The actuator 312 may also move the shift collar 310 along the axis 70 to first and second neutral positions, which are best shown in FIGS. 8 and 10. It is noted that in FIGS. 7-11 only a portion of the transmission 204 is shown to better illustrate movement of the shift collar 310. It is also noted that the shift collar 310 in FIGS. 7-11 includes a first shift collar gear 334 and a second shift collar gear 336 unlike the configuration shown in FIGS. 2 and 4, which lacks a second shift collar gear 336. In the configuration shown in FIGS. 2 and 4, the shift collar may move between the same plurality of positions but only the first shift collar gear 334 may couple the shift collar 310 to the transmission 204. As a result, the shift collar in FIGS. 2 and 4 may have a greater axial length, longer shift distance, longer shift time, and longer standout than the shift collar shown in FIGS. 7-11. In the examples below, reference to connecting or disconnecting a member of the set of drive pinion gears 210 to/from the drive pinion 30 includes direct and indirect connections to and disconnections from the drive pinion 30. For instance, a member of the set of drive pinion gears 210 may be directly coupled to the drive pinion 30 or indirectly connected to the drive pinion 30 such as via the drive pinion extension 90.

In FIGS. 7-11, the first shift collar gear 334 and the second shift collar gear 336 may be engageable with different members of the set of drive pinion gears 210 as will be discussed in more detail below. The first shift collar gear 334 may not connect the set of drive pinion gears 210 to the drive pinion 30 when the second shift collar gear 336 connects a member of the set of drive pinion gears 210 to the drive pinion 30. Conversely, the second shift collar gear 336 may not connect the set of drive pinion gears 210 to the drive pinion 30 when the first shift collar gear 334 connects member of the set of drive pinion gears 210 to the drive pinion 30. More specifically, in the configuration shown the first shift collar gear 334 may be engageable with the second gear 222 or the third gear 224 but not the first gear 220 or the fourth gear 226. The second shift collar gear 336 may be engageable with the fourth gear 226 but not the first gear 220, the second gear 222, or the third gear 224.

Referring to FIG. 7, the shift collar 310 is shown in the first position. In the first position, the shift collar 310 may couple the second gear 222 to the drive pinion 30. For example, the teeth of the first shift collar gear 334 may mesh with the inner gear teeth 232 of the second gear 222. Torque may be transmitted from the rotor 106 to the first gear 220 such as via the rotor output flange 130, from the first gear 220 to the first countershaft gears 270, 270', from the first countershaft gears 270, 270' to the second countershaft gears 272, 272' via the first and second countershafts 260, 260', respectively, from the second countershaft gears 272, 272' to the second gear 222, and from the second gear 222 to the drive pinion 30 via the first shift collar gear 334 of the shift collar 310. The second shift collar gear 336 may not engage the inner gear teeth 234, 236 of the third gear 224 or the fourth gear 226. As such, the first gear 220, the third gear 224, and the fourth gear 226 may be rotatable about the axis 70 with respect to the drive pinion 30 when the first gear ratio is provided. Torque may be provided at the first gear ratio in the first position, such as a high-speed gear ratio.

Referring to FIG. 8, the shift collar 310 is shown in the first neutral position. In the first neutral position, the shift collar 310 may not couple any member of the set of drive pinion gears 210 to the drive pinion 30. As such, the teeth of the first shift collar gear 334 and the teeth of the second shift collar gear 336 may be spaced apart from the first gear 220, the second gear 222, the third gear 224, and the fourth gear 226. The teeth of the first shift collar gear 334 may be axially positioned between the inner gear teeth 232 of the second gear 222 and the inner gear teeth 234 of the third gear 224. The teeth of the second shift collar gear 336 may be axially positioned between the inner gear teeth 234 of the third gear 224 and the inner gear teeth 236 of the fourth gear 226. As such, the first gear 220, the second gear 222, the third gear 224, and the fourth gear 226 may be rotatable about the axis 70 with respect to the drive pinion 30 when the shift collar 310 is in the first neutral position and torque may not be transmitted between the transmission 204 and the drive pinion 30. The first neutral position may be positioned between the first position shown in FIG. 7 and the second position shown in FIG. 9.

Referring to FIG. 9, the shift collar 310 is shown in the second position. In the second position, the shift collar 310 may couple the third gear 224 to the drive pinion 30. For example, the teeth of the first shift collar gear 334 may mesh with the inner gear teeth 234 of the third gear 224. Torque may be transmitted from the rotor 106 to the first gear 220 such as via the rotor output flange 130, from the first gear 220 to the first countershaft gears 270, 270', from the first countershaft gears 270, 270' to the third countershaft gears 274, 274' via the first and second countershafts 260, 260', respectively, from the third countershaft gears 274, 274' to the third gear 224, and from the third gear 224 to the drive pinion 30 via the first shift collar gear 334 of the shift collar 310. The second shift collar gear 336 may not engage the inner gear teeth 234 of the third gear 224 or the inner gear teeth 236 of the fourth gear 226. As such, the first gear 220, the second gear 222, and the fourth gear 226 may be rotatable about the axis 70 with respect to the drive pinion 30 when the second gear ratio is provided. Torque may be provided at the second gear ratio in the second position, such as a mid-speed gear ratio.

Referring to FIG. 10, the shift collar 310 is shown in the second neutral position. In the second neutral position, the shift collar 310 may not couple any member of the set of drive pinion gears 210 to the drive pinion 30. As such, the teeth of the first shift collar gear 334 and the teeth of the second shift collar gear 336 may be spaced apart from the first gear 220, the second gear 222, the third gear 224, and the fourth gear 226. The teeth of the first shift collar gear 334 and the teeth of the second shift collar gear 336 may be axially positioned between the inner gear teeth 234 of the third gear 224 and the inner gear teeth 236 of the fourth gear 226. As such, the first gear 220, the second gear 222, the third gear 224, and the fourth gear 226 may be rotatable about the axis 70 with respect to the drive pinion 30 when the shift collar 310 is in the second neutral position and torque may not be transmitted between the transmission 204 and the drive pinion 30. The second neutral position may be positioned between the second position shown in FIG. 9 and the third position shown in FIG. 11.

Referring to FIG. 11, the shift collar 310 is shown in the third position. In the third position, the shift collar 310 may couple the fourth gear 226 to the drive pinion 30. For example, the teeth of the second shift collar gear 336 may mesh with the inner gear teeth 236 of the fourth gear 226. Torque may be transmitted from the rotor 106 to the first gear 220 such as via the rotor output flange 130, from the first gear 220 to the first countershaft gears 270, 270', from the first countershaft gears 270, 270' to the fourth countershaft gears 276, 276' via the first and second countershafts 260, 260', respectively, from the fourth countershaft gears 276, 276' to the fourth gear 226, and from the fourth gear 226 to the drive pinion 30 via the second shift collar gear 336 of the shift collar 310. The first shift collar gear 334 may not engage the inner gear teeth 232 of the second gear 222 or the inner gear teeth 234 of the third gear 224. As such, the first gear 220, the second gear 222, and the third gear 224 may be rotatable about the axis 70 with respect to the drive pinion 30 when the third gear ratio is provided. Torque may be provided at the third gear ratio in the third position, such as a low-speed gear ratio.

The shift collar configuration shown in FIGS. 7-11 may allow a shift collar to be provided with a reduced axial length as compared to the configuration shown in FIGS. 2 and 4. Moreover, the shift collar may then have a reduced stroke or actuation distance along the axis 70. Reducing the actuation distance may not only reduce the standout or axial length of the axle assembly such as along the axis 70, but also may reduce the shift time or time to complete a gear shift as shift collar gear teeth may be axially positioned closer to the inner gear teeth of a drive pinion gear that is not currently engaged. In addition, the axial length (i.e., length in a direction that extends along the axis 70) of the teeth of the first shift collar gear 334 may be less than the axial length of the teeth of the second shift collar gear 336 as the torque that is transmitted via the first shift collar gear 334 may be less than the torque transmitted by the second shift collar gear 336. Providing a first shift collar gear 334 with teeth having a shorter axial length may also help reduce the stroke distance of the shift collar, shift times, and the standout of the axle assembly. Providing first and second shift collar gears with a shift collar may also distribute wear between the shift collar gears as opposed to a single shift collar gear, thereby reducing wear of each shift collar gear. It is also contemplated that a shift collar may be provided with shift collar gears that are only engageable with one drive pinion gear. For instance, a third shift collar gear may be provided with the shift collar, resulting in first, second, and third shift collar gears that are engageable with the second, third, and fourth gears.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shift mechanism comprising:
a shift collar;
an actuator; and
an adjuster mechanism that includes:
a collar assembly that includes:
a collar that defines a collar hole that receives the shift collar; and
a shift block that is fixedly positioned with respect to the collar, the shift block defining an elongated slot and a first hole that extends from the elongated slot, wherein the shift block includes a locking screw hole that receives a locking screw;
a follower that is partially received in the elongated slot and that is operatively connected to the actuator, the follower defining a threaded hole; and
an adjustment screw that is received in the first hole and the threaded hole and that is rotatable about an adjustment screw axis, wherein the adjustment screw has a threaded portion that is received in the elongated slot and in the threaded hole in the follower, a head that is disposed adjacent to the first hole, and a first shank portion that extends from the head to the threaded portion and is received in the first hole, wherein rotating the adjustment screw moves the collar assembly and the shift collar along an axis, and wherein the locking screw inhibits rotation of the adjustment screw.

2. The shift mechanism of claim 1 wherein rotating the adjustment screw moves the collar assembly and the shift collar along the axis independent of the actuator.

3. The shift mechanism of claim 1 wherein the shift block includes a second hole that is coaxially disposed with the first hole and that extends from the elongated slot, and wherein the adjustment screw is received in the second hole.

4. The shift mechanism of claim 3 wherein the first hole has a larger diameter than the second hole and the first hole and the second hole are not threaded.

5. The shift mechanism of claim 3 wherein the elongated slot has a major axis that extends from the first hole to the second hole and a minor axis that is disposed substantially perpendicular to the major axis, wherein the major axis has a greater length than the minor axis.

6. The shift mechanism of claim 5 wherein the follower has a width that is less than a length of the minor axis.

7. A shift mechanism comprising:
a shift collar;
an actuator; and
an adjuster mechanism that includes:
a collar assembly that includes:
a collar that defines a collar hole that receives the shift collar; and
a shift block that is fixedly positioned with respect to the collar, the shift block defining an elongated slot and a first hole that extends from the elongated slot;
a follower that is partially received in the elongated slot and that is operatively connected to the actuator, the follower defining a threaded hole; and
an adjustment screw that is received in the first hole and the threaded hole and that is rotatable about an adjustment screw axis, wherein the adjustment screw has a threaded portion that is received in the elongated slot and in the threaded hole in the follower, wherein rotating the adjustment screw moves the collar assembly and the shift collar along an axis, and wherein the adjustment screw has a second shank portion that extends from the threaded portion to an end of the adjustment screw that is disposed opposite the head, wherein the second shank portion is received in a second hole of the shift block.

8. The shift mechanism of claim 7 wherein the adjustment screw has a head that is disposed adjacent to the first hole and a first shank portion that extends from the head to the threaded portion and is received in the first hole.

9. The shift mechanism of claim 8 wherein the shift block includes a locking screw hole that receives a locking screw that inhibits rotation of the adjustment screw.

10. The shift mechanism of claim 9 wherein the head includes a plurality of teeth that extend away from the adjustment screw axis, and the locking screw is received in a gap between adjacent teeth to inhibit rotation of the adjustment screw.

11. The shift mechanism of claim 7 wherein a retainer is mounted to the second shank portion to inhibit removal of the adjustment screw from the shift block.

12. The shift mechanism of claim 11 wherein the retainer is disposed proximate the end of the adjustment screw and is disposed outside the second hole.

13. The shift mechanism of claim 7 wherein rotating the adjustment screw moves the collar assembly and the shift collar along the axis independent of the actuator.

14. An axle assembly comprising:
a drive pinion that is rotatable about an axis;
a transmission that includes a set of drive pinion gears that are spaced apart from the drive pinion and are rotatable about the axis; and
a shift mechanism that includes:
 a shift collar that is rotatable about the axis with the drive pinion and moveable along the axis with respect to the drive pinion;
 an actuator that is configured to move the shift collar along the axis to selectively connect a member of the set of drive pinion gears to the drive pinion; and
 an adjuster mechanism that connects the actuator to the shift collar, wherein the adjuster mechanism includes:
  a collar assembly that includes:
   a collar that defines a collar hole that receives the shift collar; and
   a shift block that is fixedly positioned with respect to the collar, the shift block defining an elongated slot and a first hole that extends from the elongated slot;
  a follower that is partially received in the elongated slot and that is operatively connected to the actuator, the follower defining a threaded hole; and
  an adjustment screw that is received in the first hole and the threaded hole and that is rotatable about an adjustment screw axis, wherein rotating the adjustment screw moves the collar assembly with respect to the follower, and rotating the adjustment screw moves the collar assembly and the shift collar along the axis independent of the actuator.

15. The axle assembly of claim 14 wherein the shift mechanism includes a linkage that is coupled to the actuator and a portion of the follower that protrudes from the elongated slot is received in an opening in the linkage.

16. The axle assembly of claim 15 wherein the shift mechanism includes a detent linkage that is fixedly positioned with respect to the linkage, the detent linkage defining a recess that is configured to receive a detent feature that inhibits movement of the linkage and the follower.

17. The axle assembly of claim 16 wherein the adjustment screw is rotated when the detent feature is received in the recess.

18. The axle assembly of claim 16 wherein the linkage and the detent linkage are rotatable about an actuator axis and the linkage is disposed along the actuator axis closer to the actuator than the detent linkage is disposed to the actuator.

19. The axle assembly of claim 14 wherein the collar has a first collar side that faces toward the drive pinion and a second collar side that is disposed opposite the first collar side, wherein a first thrust bearing is disposed between the first collar side and the shift collar and a second thrust bearing is positioned between the second collar side and a retainer nut that is mounted to the shift collar, wherein the first thrust bearing and the second thrust bearing facilitate rotation of the shift collar about the axis with respect to the collar assembly.

20. The axle assembly of claim 14 wherein the shift collar has a first end that faces toward the drive pinion, a second end that is disposed opposite the first end, a first tubular shift collar portion that extends from the first end toward the second end, and a second tubular shift collar portion that extends from the second end toward the first tubular shift collar portion, wherein the first tubular shift collar portion has a larger diameter than the second tubular shift collar portion and the second tubular shift collar portion is received in the collar hole.

* * * * *